(12) United States Patent
Wroblewski

(10) Patent No.: US 7,386,806 B2
(45) Date of Patent: Jun. 10, 2008

(54) SCALING AND LAYOUT METHODS AND SYSTEMS FOR HANDLING ONE-TO-MANY OBJECTS

(75) Inventor: Frank J. Wroblewski, Gaithersburg, MD (US)

(73) Assignee: Hillcrest Laboratories, Inc., Rockville, MD (US)

( * ) Notice: Subject to any disclaimer, the term of this patent is extended or adjusted under 35 U.S.C. 154(b) by 113 days.

(21) Appl. No.: 11/325,768

(22) Filed: Jan. 5, 2006

(65) Prior Publication Data

US 2006/0150215 A1    Jul. 6, 2006

Related U.S. Application Data

(60) Provisional application No. 60/641,421, filed on Jan. 5, 2005.

(51) Int. Cl.
G06F 3/048 (2006.01)
G06F 3/00 (2006.01)
G06F 13/00 (2006.01)
H04N 5/445 (2006.01)

(52) U.S. Cl. .................. 715/788; 725/37; 725/45; 725/47

(58) Field of Classification Search ................ 715/788; 725/47

See application file for complete search history.

(56) References Cited

U.S. PATENT DOCUMENTS

| 4,745,402 | A |   | 5/1988  | Auerbach |
|-----------|---|---|---------|----------|
| 5,045,843 | A |   | 9/1991  | Hansen |
| 5,341,466 | A |   | 8/1994  | Perlin et al. |
| 5,359,348 | A |   | 10/1994 | Pilcher et al. |
| 5,515,488 | A | * | 5/1996  | Hoppe et al. ............... 345/440 |
| 5,638,523 | A |   | 6/1997  | Mullet et al. |
| 5,671,342 | A |   | 9/1997  | Millier et al. |
| 5,745,710 | A |   | 4/1998  | Clanton, III et al. |
| 5,790,121 | A |   | 8/1998  | Sklar et al. |
| 5,793,438 | A |   | 8/1998  | Bedard |
| 5,796,395 | A |   | 8/1998  | de Hond |
| 5,835,156 | A |   | 11/1998 | Blonstein et al. |
| 5,912,612 | A |   | 6/1999  | DeVolpi |
| 5,940,072 | A |   | 8/1999  | Jahanghir et al. |
| 5,955,988 | A |   | 9/1999  | Blonstein et al. |
| 5,963,916 | A | * | 10/1999 | Kaplan ........................ 705/26 |
| 5,978,043 | A |   | 11/1999 | Blonstein et al. |
| 5,982,369 | A |   | 11/1999 | Sciammarella et al. |
| 6,002,394 | A |   | 12/1999 | Schein et al. |

(Continued)

FOREIGN PATENT DOCUMENTS

GB    2 237 911 A    5/1991

(Continued)

OTHER PUBLICATIONS

Youssef, Moustafa A., Cross Language Information Retrieval. Apr. 2001. [online] Retrieved on Jul. 20, 2007 from <http://www.otal.umd.edu/uupractice/clir/>.*

(Continued)

*Primary Examiner*—William L. Bashore
*Assistant Examiner*—Stephen Alvesteffer
(74) *Attorney, Agent, or Firm*—Potomac Patent Group PLLC

(57) ABSTRACT

Systems and methods according to the present invention provide layout structures and methods for user interfaces.

30 Claims, 20 Drawing Sheets

U.S. PATENT DOCUMENTS

| | | |
|---|---|---|
| 6,005,578 A | 12/1999 | Cole |
| 6,016,144 A | 1/2000 | Blonstein et al. |
| 6,037,933 A | 3/2000 | Blonstein et al. |
| 6,049,823 A | 4/2000 | Hwang |
| 6,057,831 A | 5/2000 | Harms et al. |
| 6,088,031 A | 7/2000 | Lee et al. |
| 6,092,076 A | 7/2000 | McDonough et al. |
| 6,154,723 A | 11/2000 | Cox et al. |
| 6,175,362 B1 | 1/2001 | Harms et al. |
| 6,181,333 B1 | 1/2001 | Chaney et al. |
| 6,191,781 B1 | 2/2001 | Chaney et al. |
| 6,195,089 B1 | 2/2001 | Chaney et al. |
| 6,268,849 B1 | 7/2001 | Boyer et al. |
| 6,295,646 B1 | 9/2001 | Goldschmidt Iki |
| 6,314,575 B1 | 11/2001 | Billock et al. |
| 6,330,858 B1 | 12/2001 | McDonough et al. |
| 6,349,257 B1 | 2/2002 | Liu et al. |
| 6,385,542 B1 | 5/2002 | Millington |
| 6,397,387 B1 | 5/2002 | Rosin et al. |
| 6,400,406 B1 | 6/2002 | Kim |
| 6,411,308 B1 | 6/2002 | Blonstein et al. |
| 6,412,110 B1 | 6/2002 | Schein et al. |
| 6,415,226 B1 | 7/2002 | Kozak |
| 6,421,067 B1 | 7/2002 | Kamen et al. |
| 6,426,761 B1 | 7/2002 | Kanevsky et al. |
| 6,429,813 B2 | 8/2002 | Feigen |
| 6,434,556 B1* | 8/2002 | Levin et al. .................. 707/5 |
| 6,452,609 B1 | 9/2002 | Katinsky et al. |
| 6,529,218 B2 | 3/2003 | Ogawa et al. |
| 6,577,350 B1 | 6/2003 | Proehl et al. |
| 6,621,452 B2 | 9/2003 | Knockeart et al. |
| 6,735,777 B1 | 5/2004 | Kim |
| 6,753,849 B1 | 6/2004 | Curran et al. |
| 6,765,598 B2 | 7/2004 | Kim |
| 6,842,653 B2 | 1/2005 | Weishut et al. |
| 7,028,050 B1* | 4/2006 | Rose ..................... 707/104.1 |
| 2002/0059603 A1 | 5/2002 | Kelts |
| 2002/0075317 A1* | 6/2002 | Dardick .................. 345/808 |
| 2002/0112237 A1 | 8/2002 | Kelts |
| 2002/0129366 A1 | 9/2002 | Schein et al. |
| 2003/0160815 A1* | 8/2003 | Muschetto ............... 345/733 |
| 2004/0073922 A1* | 4/2004 | True ........................ 725/45 |
| 2004/0117831 A1 | 6/2004 | Ellis et al. |
| 2004/0160462 A1* | 8/2004 | Sheasby et al. .......... 345/788 |
| 2004/0215657 A1* | 10/2004 | Drucker et al. .......... 707/104.1 |
| 2004/0268393 A1 | 12/2004 | Hunleth et al. |
| 2005/0188326 A1* | 8/2005 | Ikeda ..................... 715/788 |
| 2005/0253806 A1 | 11/2005 | Liberty et al. |
| 2005/0289593 A1 | 12/2005 | Spilo |
| 2006/0010395 A1* | 1/2006 | Aaltonen .................. 715/779 |
| 2006/0026639 A1 | 2/2006 | Potrebic et al. |

FOREIGN PATENT DOCUMENTS

| | | |
|---|---|---|
| WO | WO 98/43183 | 10/1998 |

OTHER PUBLICATIONS

Quesenbery, W., et al., Designing for Interactive Television, http://www.wqusability.com/articles/itv-design.html, 1996, pp. 1-6.

Prasar, V., Technology to the aid of science popularisation, http://www.vigyanprasar.com/dream/jan99/janvpinsight.htm, Jan. 1999, pp. 1-2.

Press Release, NetTV Selected for 800 Kansas City Classrooms, http://www.fno.org/mar98/NKCSDPR1.html, Mar. 23, 1998, pp. 1-2.

Fuerst, J., et al., Interactive Television: A Survey of the State of Research and the Proposal and Evaluation of a User Interface, http://wwwai.wu-wien.ac.at/~koch/stud/itv/paper.html, Jun. 1996, pp. 1-11.

Bier, E., et al., Toolglass and Magic Lenses: The See-Through Interface, Proceedings of Siggraph 93, Computer Graphics Annual Conference Series, ACM, Aug. 1993, pp. 73-80.

Stone, M., et al., The Movable Filter as a User Interface Tool, Proceedings of CHI '94, ACM, Apr. 24-28, 1994, pp. 306-312.

Bier, E., et al., A Taxonomy of See-Through Tools, Proceedings of CHI '94, ACM, Apr. 24-28, 1994, pp. 358-364.

Fishkin, K., et al., Enhanced Dynamic Queries via Movable Filters, pp. 1-6 May 1995.

Bederson, B., Quantum Treemaps and Bubblemaps for a Zoomable Image Browser, UIST 2001, ACM Symposium on User Interface Software and Technology, CHI Letters 3(2), pp. 71-80.

International Search Report for PCT/US04/14487.

Written Opinion of the International Searching Authority for PCT/US04/14487.

Verhoeven, A., et al., "Hypermedia on the Map: Spatial Hypermedia in HyperMap," International Conference on Information, Communications and Signal Processing, ICICS '97, Singapore, Sep. 9-12, 1997, pp. 589-592.

International Search Report for PCT/US01/08377, mailed Jul. 25, 2005.

International Search Report for PCT/US01/08331, mailed Nov. 13, 2002.

International Search Report for PCT/US01/08261, mailed Aug. 5, 2002.

* cited by examiner

DRAMA

APOLLO 13

APOLLO 13 (1995)
Length: 120 Minutes    Price: $3.99

(BUY/WATCH TRAILER/BACK)

Massively popular, fast-paced retelling of near-disaster space mission. Much to enjoy for fans of suspense and special effects. Well-developed characters appeal even to those who don't like typical Hollywood epics.

Actors: Tom Hanks, Bill Paxton, Kevin Bacon, Gary Sinise, Ed Harris

Tom Hanks

American leading actor Tom Hanks has become one of the most popular stars in contemporary American cinema. Born July 9, 1956, in Concord, CA.

Rated by Empire Magazine as 17th out of The Top 100 Movie Stars of All Time in October 1997, Hanks is married to actress Rita Wilson, with whom he appeared in Volunteers (1985).

Filmography
Saving Private Ryan
The Green Mile
Forrest Gump
Road to Perdition
Apollo 13
Philadelphia
Toy Story
Cast Away

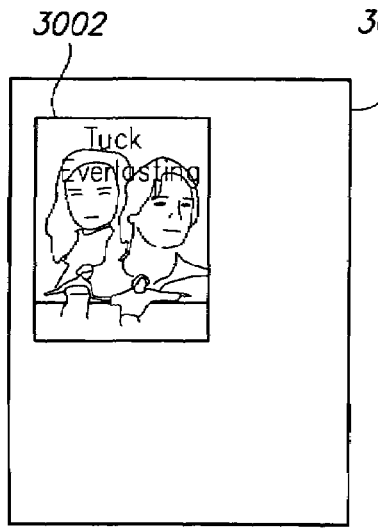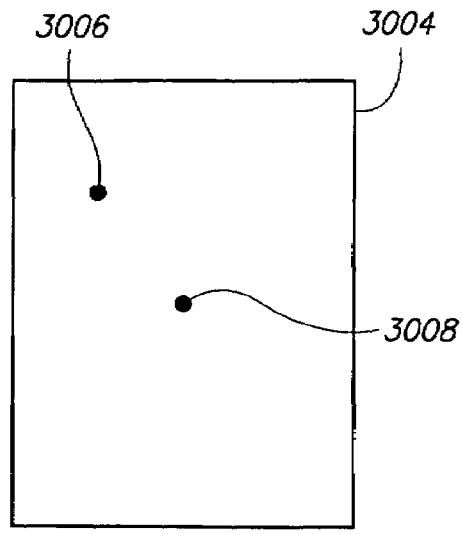
FIG. 15a              FIG. 15b
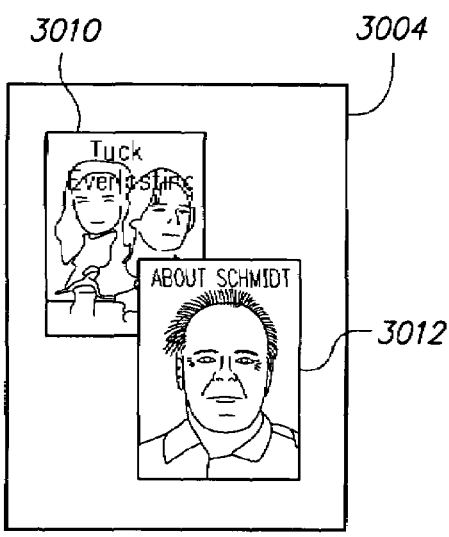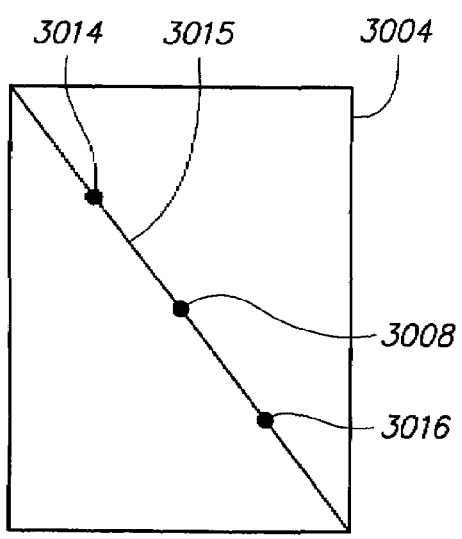
FIG. 15c              FIG. 15d

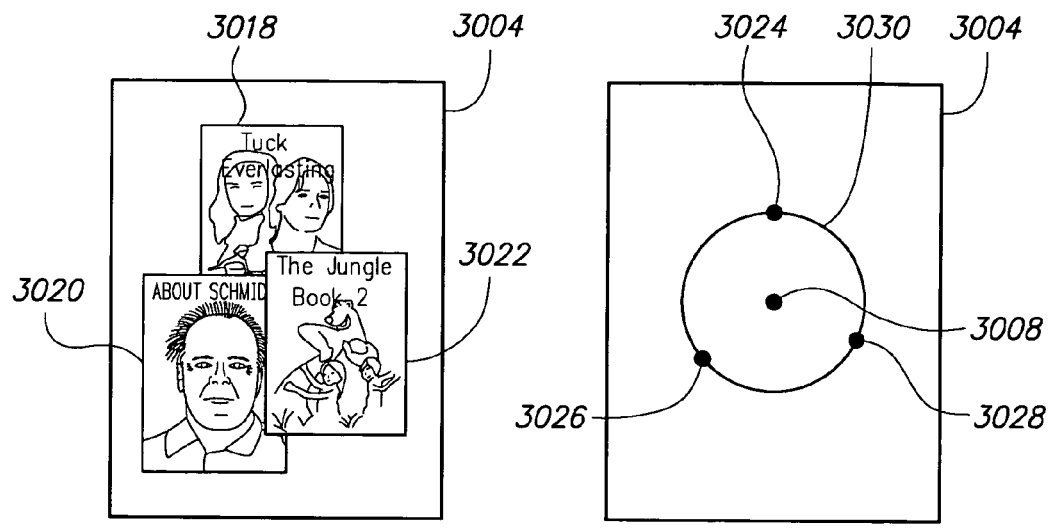
FIG. 15e        FIG. 15f
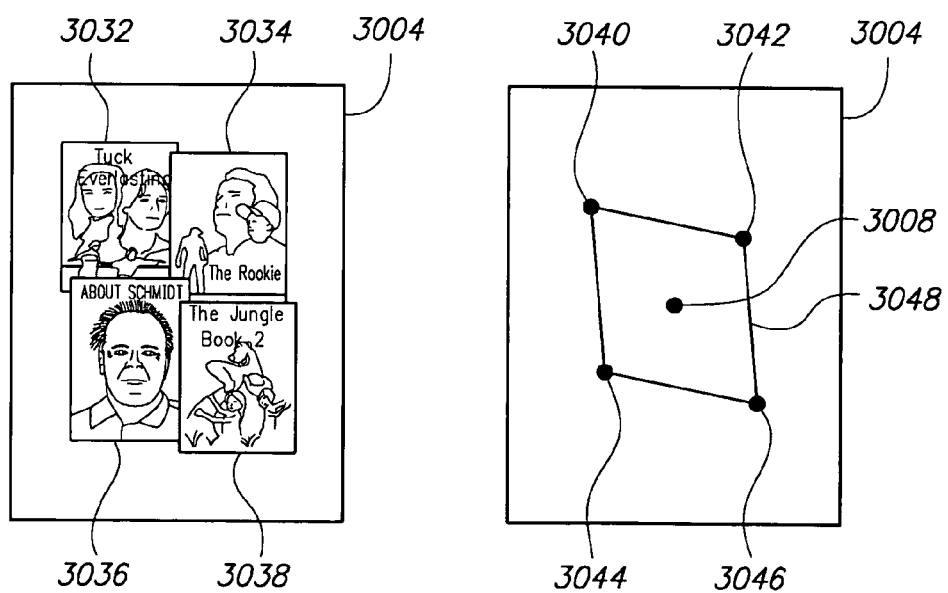
FIG. 15g        FIG. 15h

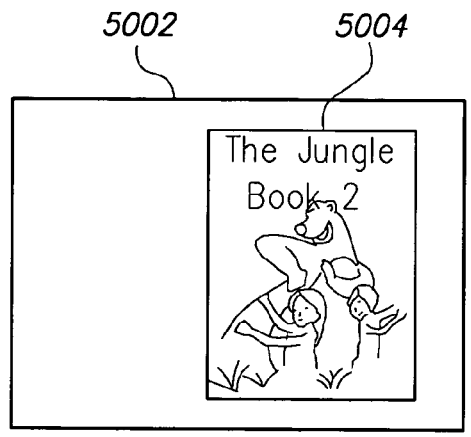
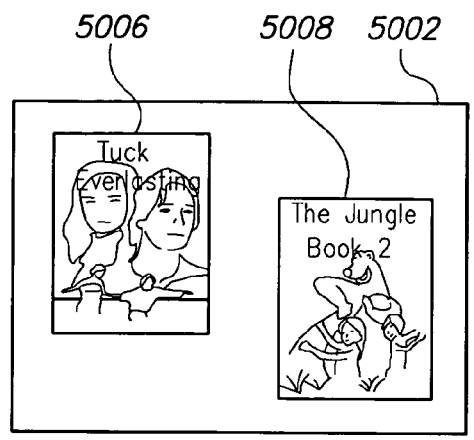
FIG. 17a          FIG. 17b
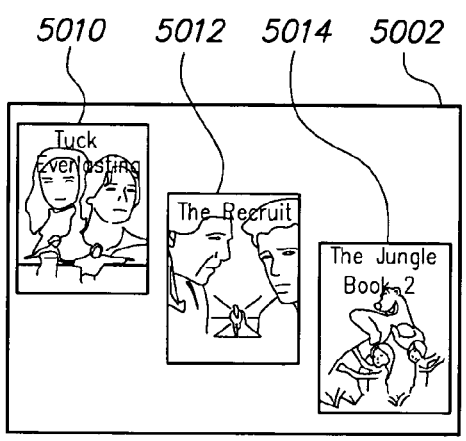
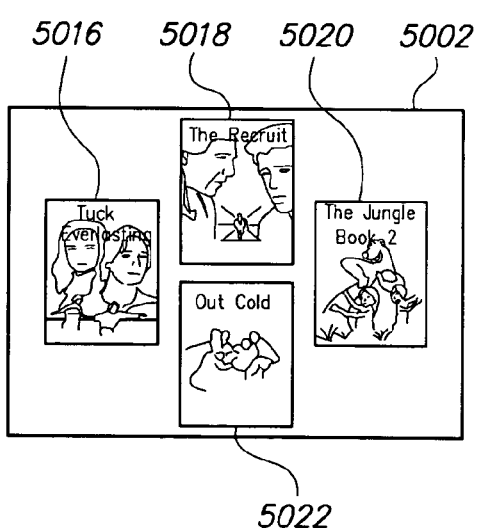
FIG. 17c          FIG. 17d

SCALING AND LAYOUT METHODS AND SYSTEMS FOR HANDLING ONE-TO-MANY OBJECTS

RELATED APPLICATIONS

This application is related to, and claims priority from, U.S. Provisional Patent Application Ser. No. 60/641,421, filed on Jan. 5, 2005, entitled "Scaling and Layout Methods and Systems for Handling One-to-Many Objects", the disclosure of which is incorporated here by reference.

BACKGROUND

The present invention describes a framework for organizing, selecting and launching media items. Part of that framework involves the design and operation of graphical user interfaces with the basic building blocks of point, click, scroll, hover and zoom and, more particularly, to graphical user interfaces associated with media items which can be used with a three-dimensional (hereinafter "3D") pointing remote.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and potentially thousands of channels of shows and information. Video-on-demand technology, currently used primarily in hotels and the like, provides the potential for in-home entertainment selection from among thousands of movie titles. Digital video recording (DVR) equipment such as offered by TiVo, Inc., 2160 Gold Street. Alviso, Calif. 95002, further expand the available choices.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface and control device options and framework for televisions has not changed much over the last 30 years. Printed guides are still the most prevalent mechanism for conveying programming information. The multiple button remote control with simple up and down arrows is still the most prevalent channel/content selection mechanism. The reaction of those who design and implement the TV user interface to the increase in available media content has been a straightforward extension of the existing selection procedures and interface objects. Thus, the number of rows and columns in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. A good example of this trend is the combination television/VCR/DVD in which three previously independent components are frequently sold today as an integrated unit. This trend is likely to continue, potentially with an end result that most if not all of the communication devices currently found in the household being packaged as an integrated unit, e.g., a television/VCR/DVD/internet access/radio/stereo unit. Even those who buy separate components desire seamless control of and interworking between them. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. Electronic program guides (EPGs) have been developed and implemented to replace the afore-described media guides. Early EPGs provided what was essentially an electronic replica of the printed media guides. For example, cable service operators have provided analog EPGs wherein a dedicated channel displays a slowly scrolling grid of the channels and their associated programs over a certain time horizon, e.g., the next two hours. Scrolling through even one hundred channels in this way can be tedious and is not feasibly scalable to include significant additional content deployment, e.g., video-on-demand. More sophisticated digital EPGs have also been developed. In digital EPGs, program schedule information, and optionally applications/system software, is transmitted to dedicated EPG equipment, e.g., a digital set-top box (STB). Digital EPGs provide more flexibility in designing the user interface for media systems due to their ability to provide local interactivity and to interpose one or more interface layers between the user and the selection of the media items to be viewed. An example of such an interface can be found in U.S. Pat. No. 6,421,067 to Kamen et al., the disclosure of which is incorporated here by reference. FIG. 2 depicts a GUI described in the '067 patent. Therein, according to the Kamen et al. patent, a first column 190 lists program channels, a second column 191 depicts programs currently playing, a column 192 depicts programs playing in the next half-hour, and a fourth column 193 depicts programs playing in the half hour after that. The baseball bat icon 121 spans columns 191 and 192, thereby indicating that the baseball game is expected to continue into the time slot corresponding to column 192. However, text block 111 does not extend through into column 192. This indicates that the football game is not expected to extend into the time slot corresponding to column 192. As can be seen, a pictogram 194 indicates that after the football game, ABC will be showing a horse race. The icons shown in FIG. 2 can be actuated using a cursor, not shown, to implement various features, e.g., to download information associated with the selected programming. Other digital EPGs and related interfaces are described, for example, in U.S. Pat. Nos. 6,314,575, 6,412,110, and 6,577,350, the disclosures of which are also incorporated here by reference.

However, the interfaces described above suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be more speedy to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist.

Organizing frameworks, techniques and systems which simplify the control and screen interface between users and media systems as well as accelerate the selection process have been described in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference and which is hereafter referred to as the "'432 application".

Such frameworks permit service providers to take advantage of the increases in available bandwidth to end user equipment by facilitating the supply of a large number of media items and new services to the user.

Thus, it would be desirable to provide interfaces which supply an easy and fast selection experience regardless of the size(s) of the media item collection(s) being browsed. One objective associated with such interfaces is to lay out the items in a manner which provides a pleasing appearance to the user. Another objective is to make better use of limited display (e.g., TV screen) space to display more and larger images per layout. Yet another objective is to automatically provide layouts of multiple groups having the same or varying sizes.

SUMMARY

Systems and methods according to the present invention address these needs and others by providing a user interface displayed on a screen with a plurality of control elements, at least some of the plurality of control elements having at least one alphanumeric character displayed thereon. A text box for displaying alphanumeric characters entered using the plurality of control elements and a plurality of groups of displayed items. The layout of the plurality of groups on the user interface is based on a first number of groups which are displayed, and wherein a layout of the displayed items within a group is based on a second number of items displayed within that group.

According to one exemplary embodiment of the present invention, a method for laying out items in a user interface includes the steps of: laying out a plurality of groups of items within a group display space, the groups being laid out within the display space in a pattern which varies as a function of the number of the plurality of groups, and laying out, for each of the plurality of groups, a plurality of items within an item display space associated with a respective one of the plurality of groups, the items being laid out within a respective item display space in a pattern which varies as a function of the number of the plurality of items.

BRIEF DESCRIPTION OF THE DRAWINGS

The accompanying drawings illustrate exemplary embodiments of the present invention, wherein:

FIGS. 9-13 depict a zoomable graphical user interface according to another exemplary embodiment of the present invention;

DETAILED DESCRIPTION

Figure 1:
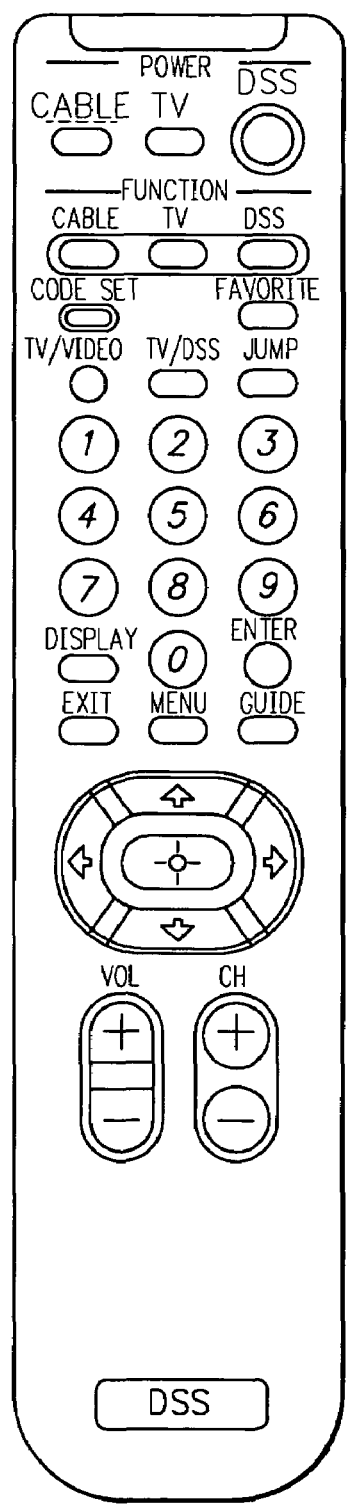
FIG. 1 depicts a conventional remote control unit for an entertainment system.
Figure 2:
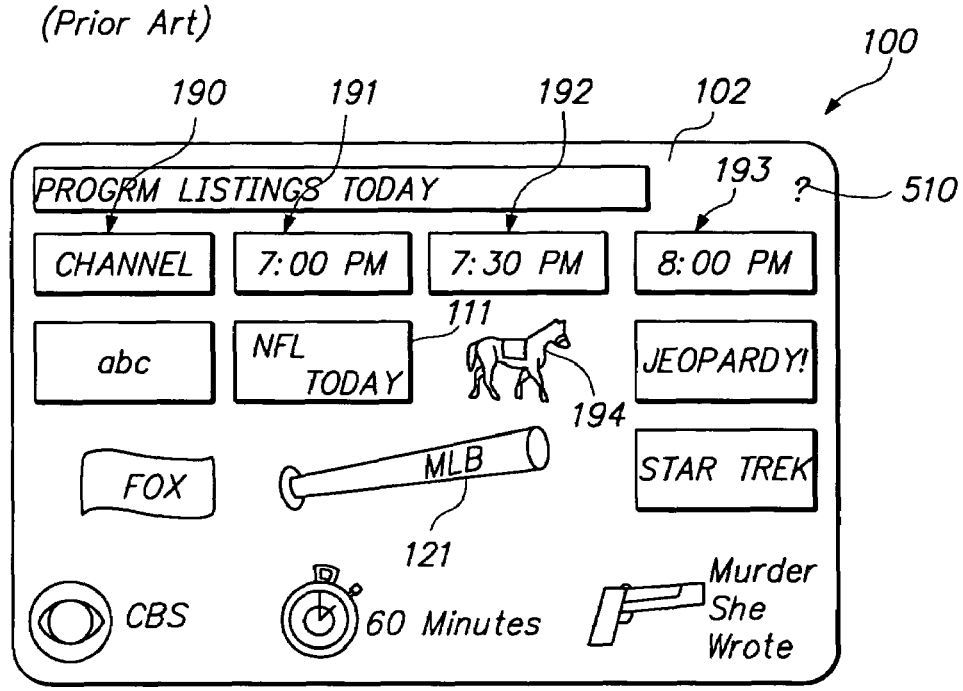
FIG. 2 depicts a conventional graphical user interface for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 3. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a media system remote control unit that supports 3D pointing, has a minimal number of buttons to support navigation, and communicates with the entertainment system 200 through RE signals. For example, wireless I/O control device 226 can be a 3D pointing device which uses a gyroscope or other mechanism to define both a screen position and a motion vector to determine the particular command desired. A set of buttons can also be included on the wireless I/O device 226 to initiate the "click" primitive described below as well as a "back" button. In another exemplary embodiment, wireless I/O control device 226 is a media system remote control unit, which communicates with the components of the entertainment system 200 through IR signals. In yet another embodiment, wireless I/O control device 226 may be an IR remote control device similar in appearance to a typical entertainment system remote control with the added feature of a track-ball or other navigational mechanisms which allows a user to position a cursor on a display of the entertainment system 200.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 3, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 3:
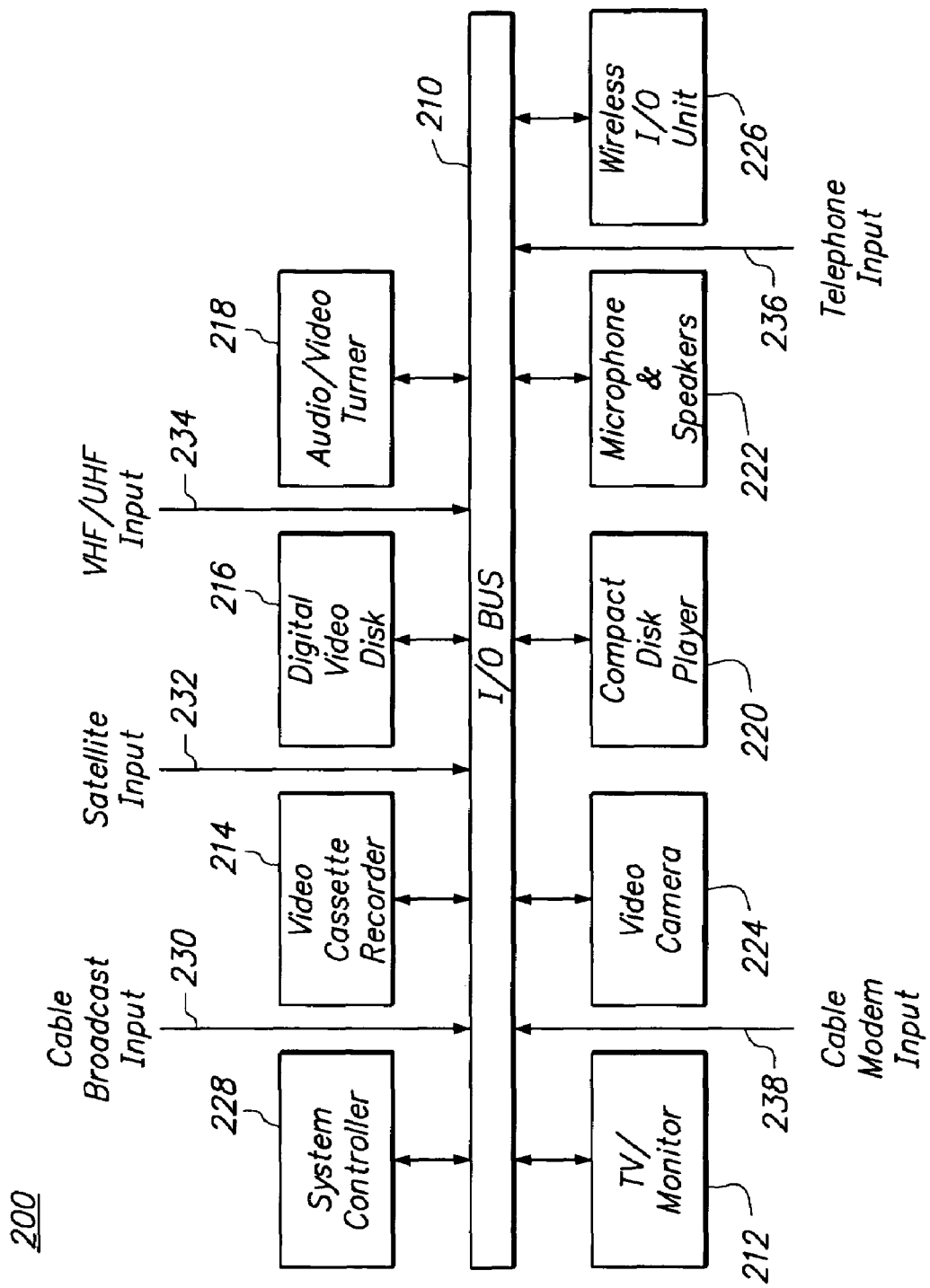
FIG. 3 depicts an exemplary media system in which exemplary embodiments of the present invention (both display and remote control) can be implemented.

As further illustrated in FIG. 3, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 3 are purely exemplary and that media system 200 may include more or fewer of both. For example, other types of inputs to the system include AM/FM radio and satellite radio.

Figure 4:
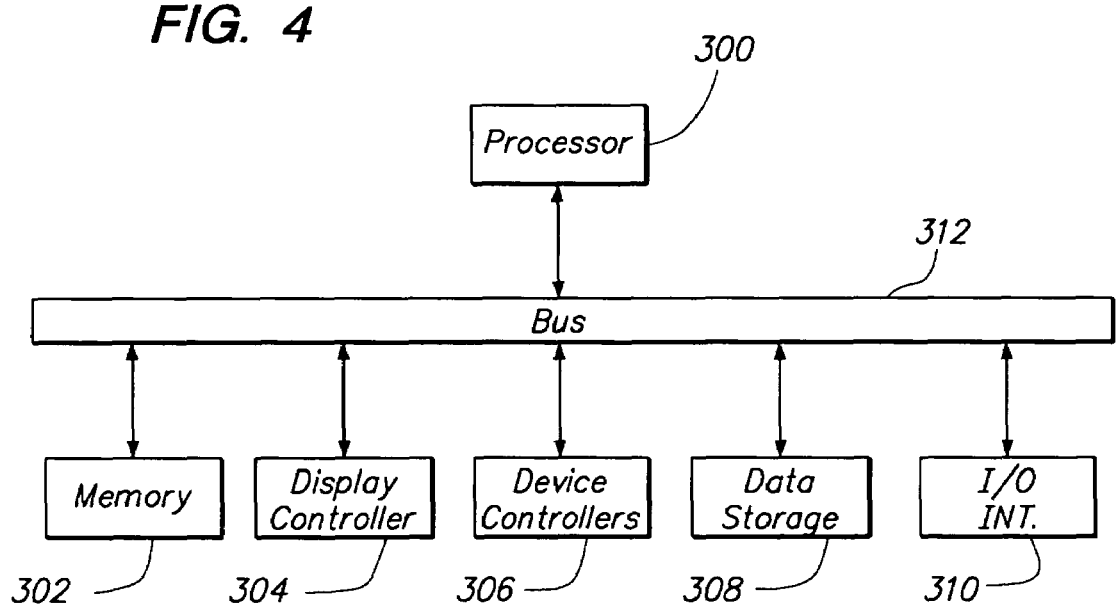
FIG. 4 shows a system controller of FIG. 3 in more detail.

FIG. 4 is a block diagram illustrating an embodiment of an exemplary system controller 228 according to the present invention. System controller 228 can, for example, be implemented as a set-top box and includes, for example, a processor 300, memory 302, a display controller 304, other device controllers (e.g., associated with the other components of system 200), one or more data storage devices 308 and an I/O interface 310. These components communicate with the processor 300 via bus 312. Those skilled in the art will appreciate that processor 300 can be implemented using one or more processing units. Memory device(s) 302 may include, for example, DRAM or SRAM, ROM, some of which may be designated as cache memory, which store software to be run by processor 300 and/or data usable by such programs, including software and/or data associated with the graphical user interfaces described below. Display controller 304 is operable by processor 300 to control the display of monitor 212 to, among other things, display GUI screens and objects as described below. Zoomable GUIs according to exemplary embodiments of the present invention provide resolution independent zooming, so that monitor 212 can provide displays at any resolution. Device controllers 306 provide an interface between the other components of the media system 200 and the processor 300. Data storage 308 may include one or more of a hard disk drive, a floppy disk drive, a CD-ROM device, or other mass storage device. Input/output interface 310 may include one or more of a plurality of interfaces including, for example, a keyboard interface, an RF interface, an IR interface and a microphone/speech interface. According to one exemplary embodiment of the present invention, I/O interface 310 will include an interface for receiving location information associated with movement of a wireless pointing device.

Generation and control of a graphical user interface according to exemplary embodiments of the present invention to display media item selection information is performed by the system controller 228 in response to the processor 300 executing sequences of instructions contained in the memory 302. Such instructions may be read into the memory 302 from other computer-readable mediums such as data storage device(s) 308 or from a computer connected externally to the media system 200. Execution of the sequences of instructions contained in the memory 302 causes the processor to generate graphical user interface objects and controls, among other things, on monitor 212. In alternative embodiments, hard-wire circuitry may be used in place of or in combination with software instructions to implement the present invention. As mentioned in the Background section, conventional interface frameworks associated with the television industry are severely limited in their ability to provide users with a simple and yet comprehensive selection experience. Accordingly, control frameworks described herein overcome these limitations and are, therefore, intended for use with televisions, albeit not exclusively. It is also anticipated that the revolutionary control frameworks, graphical user interfaces and/or various algorithms described herein will find applicability to interfaces which may be used with computers and other non-television devices. In order to distinguish these various applications of exemplary embodiments of the present invention, the terms "television" and "TV" are used in this specification to refer to a subset of display devices, whereas the terms "GUI", "GUI screen", "display" and "display screen" are intended to be generic and refer to television displays, computer displays and any other display device. More specifically, the terms "television" and "TV" are intended to refer to the subset of display devices which are able to display television signals (e.g., NTSC signals, PAL signals or SECAM signals) without using an adapter to translate television signals into another format (e.g., computer video formats). In addition, the terms "television" and "TV" refer to a subset of display devices that are generally viewed from a distance of several feet or more (e.g., sofa to a family room TV) whereas computer displays are generally viewed close-up (e.g., chair to a desktop monitor).

Having described an exemplary media system which can be used to implement control frameworks including zoomable graphical interfaces according to the present invention, several examples of such interfaces will now be described. Those skilled in the art will, however, appreciate that layout techniques and mechanisms according to exemplary embodiments of the present invention are not limited to usage in a zoomable user interface and can also be applied to user interfaces which do not use zooming mechanisms. According to some exemplary embodiments of the present invention, a user interface displays selectable items which can be grouped by category. A user points a remote unit at the category or categories of interest and depresses the selection button to zoom in or the "back" button to zoom back. Each zoom in, or zoom back, action by a user results in a change in the magnification level and/or context of the selectable items rendered by the user interface on the screen. According to exemplary embodiments, each change in magnification level can be consistent, i.e., the changes in magnification level are provided in predetermined steps. Exemplary embodiments of the present invention also provide for user interfaces which incorporate several visual techniques to achieve scaling to the very large. These techniques involve a combination of building blocks and techniques that achieve both scalability and ease-of-use, in particular techniques which supply an easy and fast selection experience regardless of the size(s) of the media item collection(s) being browsed.

The user interface is largely a visual experience. In such an environment exemplary embodiments of the present invention make use of the capability of the user to remember the location of objects within the visual environment. This is achieved by providing a stable, dependable location for user interface selection items, which is at the same time pleasing to the user and efficiently uses the allocated display space. Each object or item has a location in the zoomable layout, which location can be selected according to layout rules described below with respect to FIGS. 14-19. Once the user has found an object of interest it is natural to remember which direction was taken to locate the object. If that object is of particular interest it is likely that the user will re-visit the item more than once, which will reinforce the user's memory of the path to the object. User interfaces according to exemplary embodiments of the present invention provide visual mnemonics that help the user remember the location of items of interest. Such visual mnemonics include pan and zoom animations, transition effects which generate a geographic sense of movement across the user interface's virtual surface and consistent zooming functionality, among other things which will become more apparent based on the examples described below.

Figure 5:
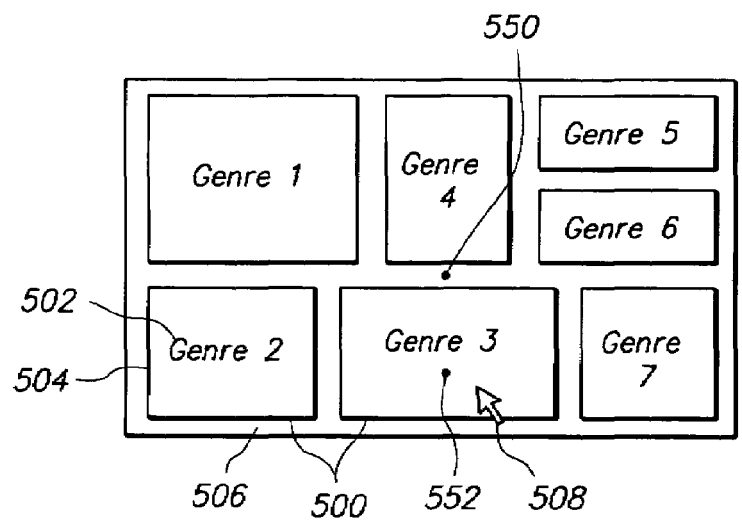
FIGS. 5-8 depict a graphical user interface for a media system according to an exemplary embodiment of the present invention.

Referring first to FIGS. 5-8, an exemplary control framework including a zoomable graphical user interface according to an exemplary embodiment of the present invention is described for use in displaying and selecting musical media items. FIG. 5 portrays the zoomable GUI at a high level e.g., a second "most zoomed out" state. Therein, the interface displays a set of shapes 500. Displayed within each shape 500 are text 502 and/or a picture 504 that describe the group of media item selections accessible via that portion of the GUI. As shown in FIG. 5, the shapes 500 are rectangles, and text 502 and/or picture 504 describe the genre of the media. However, those skilled in the art will appreciate that this first viewed GUI grouping could represent other aspects of the media selections available to the user e.g., artist, year produced, area of residence for the artist, length of the item, or any other characteristic of the selection. Also, the shapes used to outline the various groupings in the GUI need not be rectangles. Shrunk down versions of album covers and other icons could be used to provide further navigational hints to the user in lieu of or in addition to text 502 and/or picture 504 within the shape groupings 500. A background portion of the GUI 506 can be displayed as a solid color or be a part of a picture such as a map to aid the user in remembering the spatial location of genres so as to make future uses of the interface require less reading. The selection pointer (cursor) 508 follows the movements of an input device and indicates the location to zoom in on when the user presses the button on the device (not shown in FIG. 5).

According to one exemplary embodiment of the present invention, the input device can be a 3D pointing device, e.g., the 3D pointing device described in U.S. patent application Ser. No. 11/119,663, filed on May 2, 2005, entitled "3D Pointing Devices and Methods", the disclosure of which is incorporated here by reference and which is hereafter referred to as the "663 application", coupled with a graphical user interface that supports the point, click, scroll, hover and zoom building blocks which are described in more detail below. One feature of this exemplary input device that is beneficial for use in conjunction with the present invention is that it can be implemented with only two buttons and a scroll wheel, i.e., three input actuation objects. One of the buttons can be configured as a ZOOM IN (select) button and one can be configured as a ZOOM OUT (back) button. Compared with the conventional remote control units, e.g., that shown in FIG. 1, the present invention simplifies this aspect of the GUI by greatly reducing the number of buttons, etc., that a user is confronted with in making his or her media item selection. An additional preferred, but not required, feature of input devices according to exemplary embodiments of the present invention is that they provide "3D pointing" capability for the user. The phrase "3D pointing" is used in this specification to refer to the ability of a user to freely move the input device in three (or more) dimensions in the air in front of the display screen and the corresponding ability of the user interface to translate those motions directly into movement of a cursor on the screen. Thus "3D pointing" differs from conventional computer mouse pointing techniques which use a surface other than the display screen, e.g., a desk surface or mousepad, as a proxy surface from which relative movement of the mouse is translated into cursor movement on the computer display screen. Use of 3D pointing in control frameworks according to exemplary embodiments of the present invention further simplifies the user's selection experience, while at the same time providing an opportunity to introduce gestures as distinguishable inputs to the interface. A gesture can be considered as a recognizable pattern of movement over time which pattern can be translated into a GUI command, e.g., a function of movement in the x, y, z, yaw, pitch and roll dimensions or any subcombination thereof. Those skilled in the art will appreciate, however that any suitable input device can be used in conjunction with zoomable GUIs according to the present invention. Other examples of suitable input devices include, but are not limited to, trackballs, touchpads, conventional TV remote control devices, speech input, any devices which can communicate/translate a user's gestures into GUI commands, or any combination thereof. It is intended that each aspect of the GUI functionality described herein can be actuated in frameworks according to the present invention using at least one of a gesture and a speech command. Alternate implementations include using cursor and/or other remote control keys or even speech input to identify items for selection.

Figure 6:
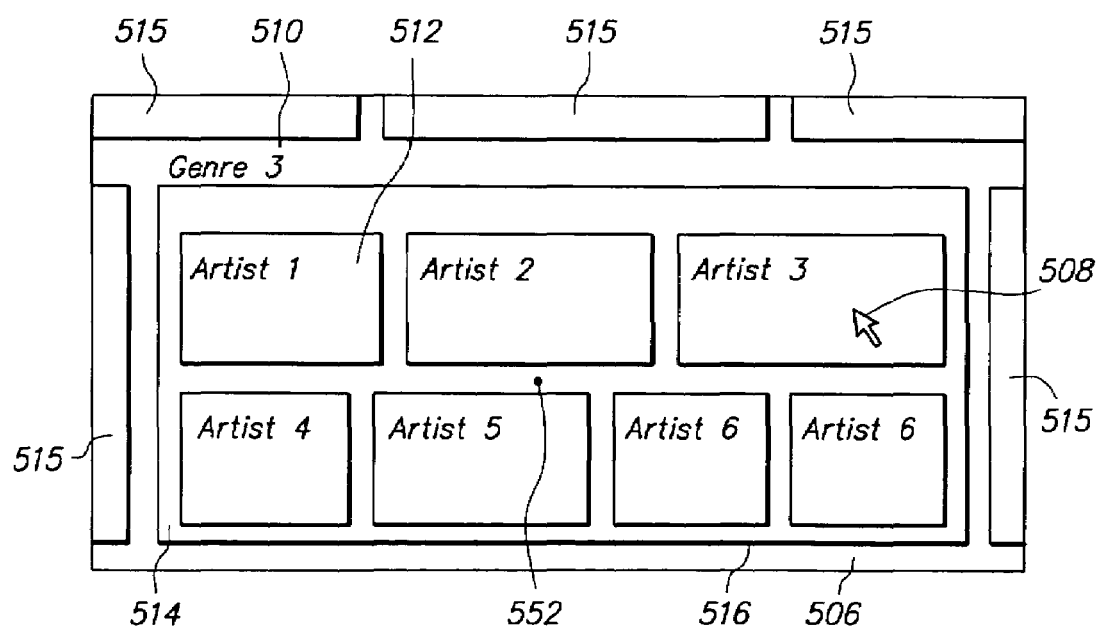

FIG. 6 shows a zoomed in view of Genre 3 that would be displayed if the user selects Genre 3 from FIG. 5, e.g., by moving the cursor 508 over the area encompassed by the rectangle surrounding Genre 3 on display 212 and depressing a button on the input device. The interface can animate the zoom from FIG. 5 to FIG. 6 so that it is clear to the user that a zoom occurred. An example of such an animated zoom/transition effect is described below. Once the shape 516 that contains Genre 3 occupies most of the screen on display 212, the interface reveals the artists that have albums in the genre. In this example, seven different artists and/or their works are displayed. The unselected genres 515 that were adjacent to Genre 3 in the zoomed out view of FIG. 5 are still adjacent to Genre 3 in the zoomed in view, but are clipped by the edge of the display 212. These unselected genres can be quickly navigated to by selection of them with selection pointer 508. It will be appreciated, however, that other exemplary embodiments of the present invention can omit clipping neighboring objects and, instead, present only the unclipped selections. Each of the artist groups, e.g., group 512, can contain images of shrunk album covers, a picture of the artist or customizable artwork by the user in the case that the category contains playlists created by the user.

Figure 7:
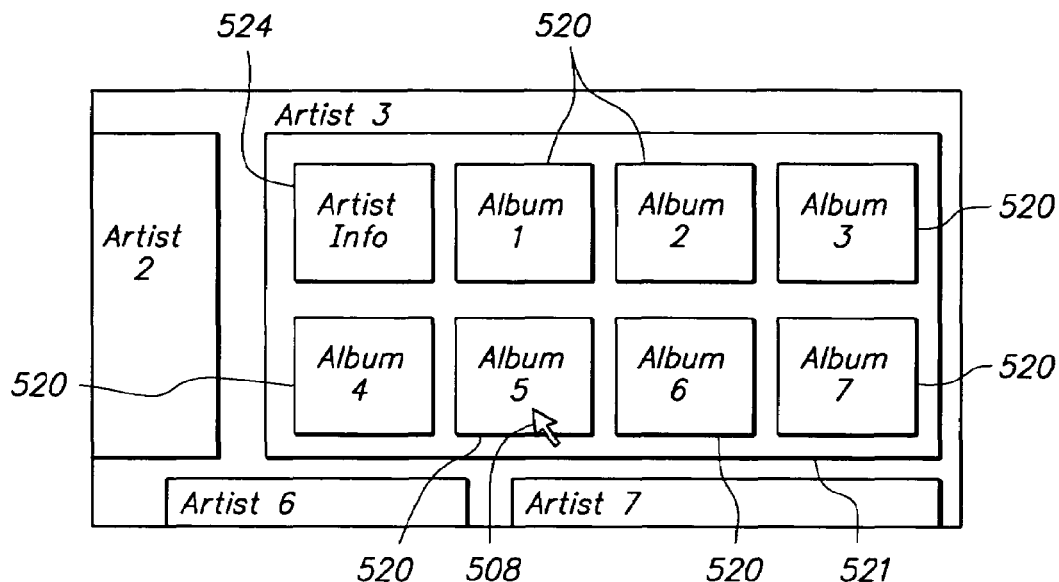

A user may then select one of the artist groups for further review and/or selection. FIG. 7 shows a further zoomed in view in response to a user selection of Artist 3 via positioning of cursor 508 and actuation of the input device, in which images of album covers 520 come into view. As with the transition from the GUI screen of FIG. 5 and FIG. 6, the unselected, adjacent artists (artists #2, 6 and 7 in this example) are shown towards the side of the zoomed in display, and the user can click on these with selection pointer 508 to pan to these artist views. In this portion of the interface, in addition to the images 520 of album covers, artist information 524 can be displayed as an item in the artist group. This information may contain, for example, the artist's picture, biography, trivia, discography, influences, links to web sites and other pertinent data. Each of the album images 520 can contain a picture of the album cover and, optionally, textual data. In the case that the album image 520 includes a user created playlist, the graphical user interface can display a picture which is selected automatically by the interface or preselected by the user.

Figure 8:
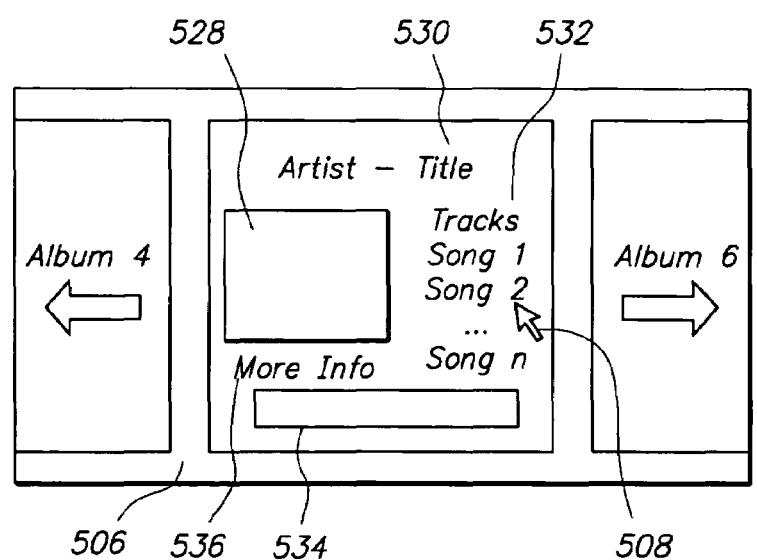
Figure 9:
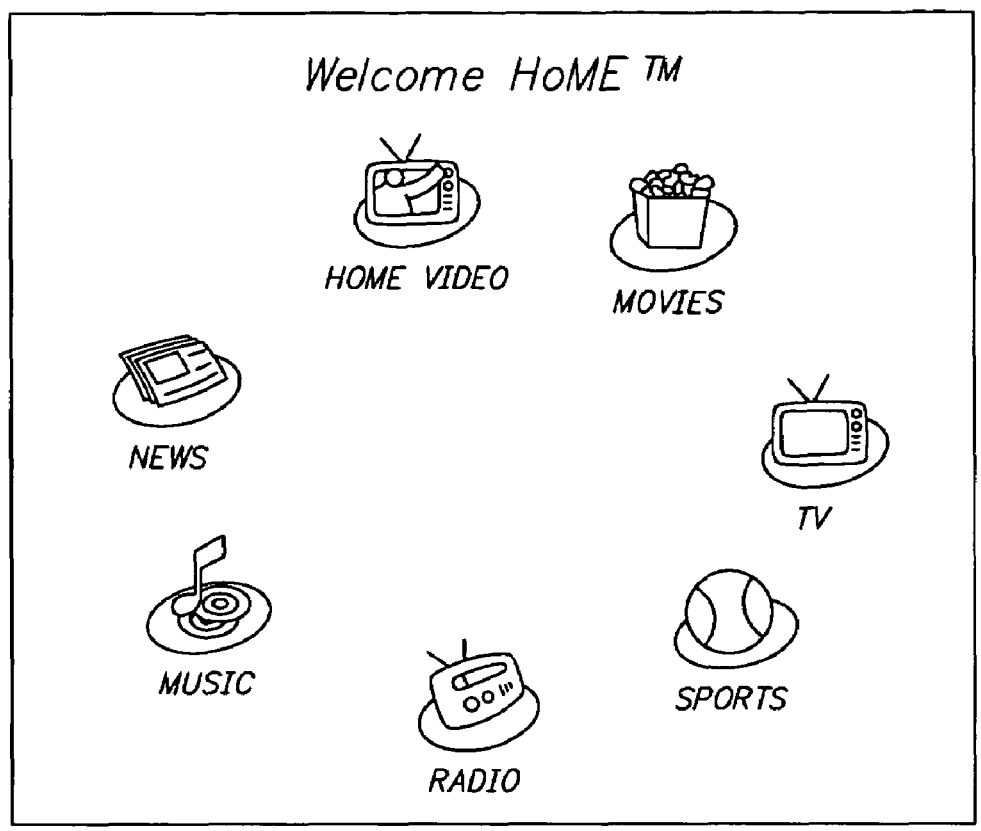

Finally, when the user selects an album cover image 520 from within the group 521, the interface zooms into the album cover as shown in FIG. 8. As the zoom progresses, the album cover can fade or morph into a view that contains items such as the artist and title of the album 530, a list of tracks 532, further information about the album 536, a smaller version of the album cover 528, and controls 534 to play back the content, modify the categorization, link to the artists web page, or find any other information about the selection. Neighboring albums 538 are shown that can be selected using selection pointer 508 to cause the interface to bring them into view. As mentioned above, alternative embodiments of the present invention can, for example, zoom in to only display the selected object, e.g., album 5, and omit the clipped portions of the unselected objects, e.g., albums 4 and 6. This final zoom provides an example of semantic zooming, wherein certain GUI elements are revealed that were not previously visible at the previous zoom level. Various techniques for performing semantic zooming according to exemplary embodiments of the present invention are provided below.

As illustrated in the FIGS. 5-8 and the description, this exemplary embodiment of a graphical user interface provides for navigation of a music collection. Interfaces according to the present invention can also be used for video collections such as for DVDs, VHS tapes, other recorded media, video-on-demand, video segments and home movies. Other audio uses include navigation of radio shows, instructional tapes, historical archives, and sound clip collections. Print or text media such as news stories and electronic books can also be organized and accessed using this invention.

As will be apparent to those skilled in the art from the foregoing description, zoomable graphical user interfaces according to the present invention provide users with the capability to browse a large (or small) number of media items rapidly and easily. This capability is attributable to many characteristics of interfaces according to exemplary embodiments of the present invention including, but not limited to: (1) the use of images as all or part of the selection information for a particular media item, (2) the use of zooming to rapidly provide as much or as little information as a user needs to make a selection and (3) the use of several GUI techniques which combine to give the user the sense that the entire interface resides on a single plane, such that navigation of the GUI can be accomplished, and remembered, by way of the user's sense of direction. This latter aspect of GUIs according to the present invention can be accomplished by, among other things, linking the various GUI screens together "geographically" by maintaining as much GUI object continuity from one GUI screen to the next, e.g., by displaying edges of neighboring, unselected objects around the border of the current GUI screen. Alternatively, if a cleaner view is desired, and other GUI techniques provide sufficient geographic feedback, then the clipped objects can be omitted. As used in this text, the phrase "GUI screen" refers to a set of GUI objects rendered on one or more display units at the same time. A GUI screen may be rendered on the same display which outputs media items, or it may be rendered on a different display. The display can be a TV display, computer monitor or any other suitable GUI output device.

Another GUI effect which enhances the user's sense of GUI screen connectivity is the panning animation effect which is invoked when a zoom is performed or when the user selects an adjacent object at the same zoom level as the currently selected object. Returning to the example of FIG. 5, as the user is initially viewing this GUI screen, his or her point-of-view is centered about point 550. However, when he or she selects Genre 3 for zooming in, his or her point-of-view will shift to point 552. According to exemplary embodiments of the present invention, the zoom in process is animated to convey the shifting the POV center from point 550 to 552. This panning animation can be provided for every GUI change, e.g., from a change in zoom level or a change from one object to another object on the same GUI zoom level. Thus if, for example, a user situated in the GUI screen of FIG. 6 selected the leftmost unselected genre 515 (Genre 2), a panning animation would occur which would give the user the visual impression of "moving" left or west. Exemplary embodiments of the present invention employ such techniques to provide a consistent sense of directional movement between GUI screens enables users to more rapidly navigate the GUI, both between zoom levels and between media items at the same zoom level.

Figure 10:
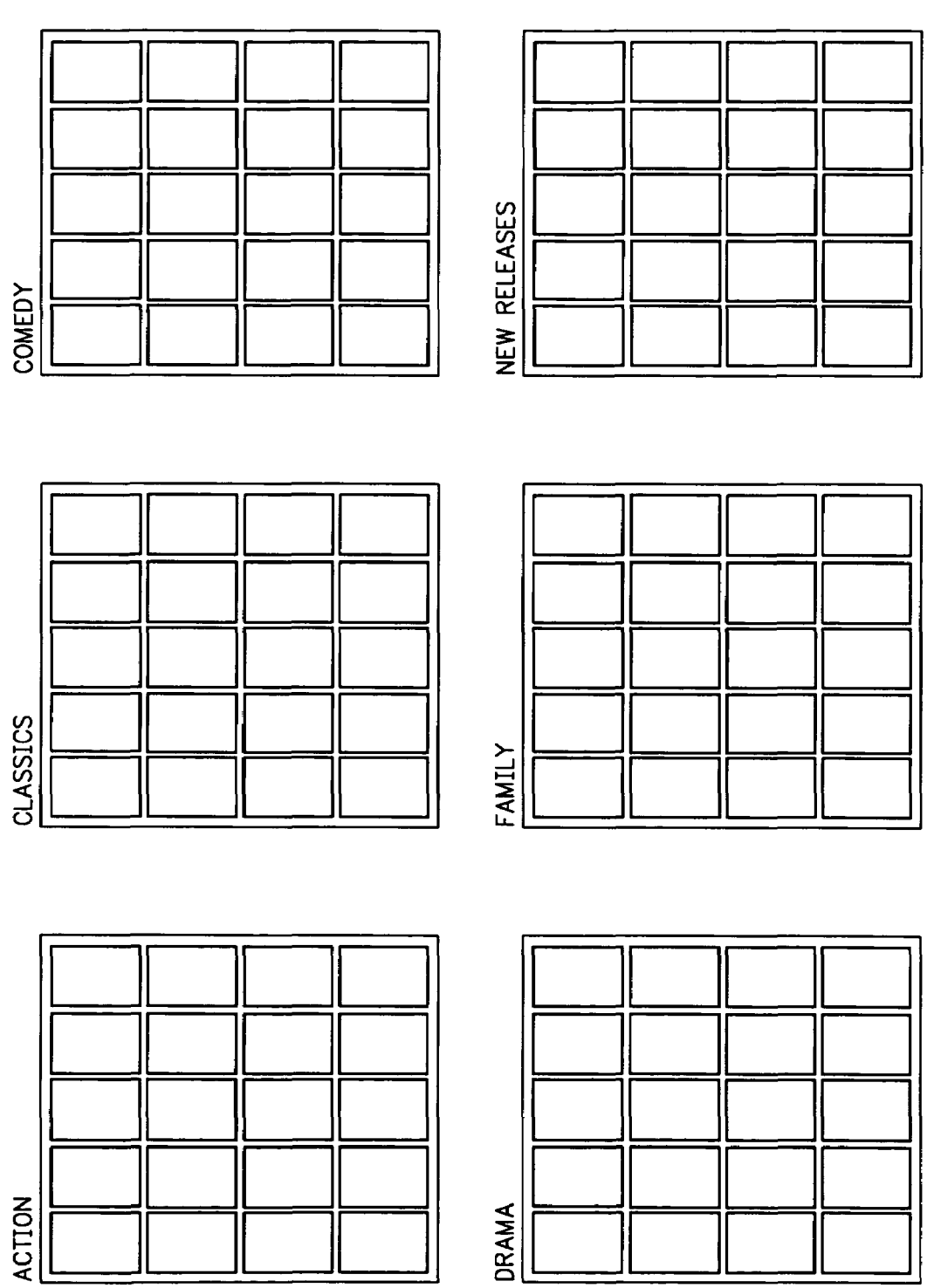

These capabilities of graphical user interfaces according to the present invention, as well as the usefulness of more sophisticated layouts and algorithms for generating such layouts, will become even more apparent upon review of another exemplary embodiment described below with respect to FIGS. 9-13. Therein, a startup GUI screen 1400 displays a plurality of organizing objects which operate as media group representations. The purely exemplary media group representations of home video, movies, TV, sports, radio, music and news could, of course include different, more or fewer media group representations. Upon actuation of one of these icons by a user, the GUI according to this exemplary embodiment will then display a plurality of images each grouped into a particular category or genre. For example, if the "movie" icon in FIG. 9 was actuated by a user, the GUI screen of FIG. 10 can then be displayed. Therein, a large number, e.g., 120 or more, selection objects are displayed. These selection objects can be categorized into particular group(s), e.g., action, classics, comedy, drama, family and new releases. Those skilled in the art will appreciate that more or fewer categories could be provided. In this exemplary embodiment, the media item images can be cover art associated with each movie selection. Although the size of the blocks in FIG. 10 is too small to permit detailed illustration of this relatively large group of selection item images, in implementation, the level of magnification of the images is such that the identity of the movie can be discerned by its associated image, even if some or all of the text may be too small to be easily read.

Figure 11:
Figure 12:

The cursor (not shown in FIG. 10) can then be disposed over a group of the movie images and the input device actuated to provide a selection indication for one of the groups. In this example the user selects the drama group and the graphical user interface then displays a zoomed version of the drama group of images as seen in FIG. 11. As with the previous embodiment, a transition effect can also be displayed as the GUI shifts from the GUI screen of FIG. 10 to the GUI screen of FIG. 11, e.g., the GUI may pan the view from the center of the GUI screen of FIG. 10 to the center of the drama group of images during or prior to the zoom. Note that although the zoomed version of the drama group of FIG. 11 only displays a subset of the total number of images in the drama group, that this zoomed version can alternatively contain all of the images in the selected group. The choice of whether or not to display all of the images in a selected group in any given zoomed in version of a GUI screen can be made based upon, for example, the number of media items in a group and a minimum desirable magnification level for a media item for a particular zoom level. This latter characteristic of GUIs according to the present invention can be predetermined by the system designer/service provider or can be user customizable via software settings in the GUI. For example, the number of media items in a group and the minimum and/or maximum magnification levels can be configurable by either or both of the service provider or the end user. Such features enable those users with, for example, poor eyesight, to increase the magnification level of media items being displayed. Conversely, users with especially keen eyesight may decrease the level of magnification, thereby increasing the number of media items displayed on a GUI screen at any one time and decrease browsing time.

One exemplary transition effect which can be employed in graphical user interfaces according to the present invention is referred to herein as the "shoe-to-detail" view effect. When actuated, this transition effect takes a zoomed out image and simultaneously shrinks and translates the zoomed out image into a smaller view, i.e., the next higher level of magnification. The transition from the magnification level used in the GUI screen of FIG. 10 to the greater magnification level used in the GUI screen of FIG. 11 results in additional details being revealed by the GUI for the images which are displayed in the zoomed in version of FIG. 11. The GUI selectively reveals or hides details at each zoom level based upon whether or not those details would display well at the currently selected zoom level. Unlike a camera zoom, which attempts to resolve details regardless of their visibility to the unaided eye, exemplary embodiments of the present invention provide for a configurable zoom level parameter that specifies a transition point between when to show the full image and when to show a version of the image with details that are withheld. The transition point can be based upon an internal resolution independent depiction of the image rather the resolution of TV/Monitor 212. In this way, GUIs according to the present invention are consistent regardless of the resolution of the display device being used in the media system.

In this exemplary embodiment, an additional amount of magnification for a particular image can be provided by passing the cursor over a particular image. This feature can be seen in FIG. 12, wherein the cursor has rolled over the image for the movie "Apollo 13". Although not depicted in FIG. 12, such additional magnification could, for example, make more legible the quote "Houston, we have a problem" which appears on the cover art of the associated media item as compared to the corresponding image in the GUI screen of FIG. 12 which is at a lower level of magnification. User selection of this image, e.g., by depressing a button on the input device, can result in a further zoom to display the details shown in FIG. 13. This provides yet another example of semantic zooming as it was previously described since various information and control elements are present in the GUI screen of FIG. 13 that were not available in the GUI screen of FIG. 12. For example, information about the movie "Apollo 13" including, among other things, the movie's runtime, price and actor information is shown. Those skilled in the art will appreciate that other types of information could be provided here. Additionally, this GUI screen includes GUI control objects including, for example, button control objects for buying the movie, watching a trailer or returning to the previous GUI screen (which could also be accomplished by depressing the ZOOM OUT button on the input device). Hyperlinks can also be used to allow the user to jump to, for example, GUI screens associated with the related movies identified in the lower right hand corner of the GUI screen of FIG. 13 or information associated with the actors in this movie. In this example, some or all of the film titles under the heading "Filmography" can be implemented as hyperlinks which, when actuated by the user via the input device, will cause the GUI to display a GUI screen corresponding to that of FIG. 13 for the indicated movie.

A transition effect can also be employed when a user actuates a hyperlink. Since the hyperlinks may be generated at very high magnification levels, simply jumping to the linked media item may cause the user to lose track of where he or she is in the media item selection "map". Accordingly, exemplary embodiments of the present invention provide a transition effect to aid in maintaining the user's sense of geographic position when a hyperlink is actuated. One exemplary transition effect which can be employed for this purpose is a hop transition. In an initial phase of the transition effect, the GUI zooms out and pans in the direction of the item pointed to by the hyperlink. Zooming out and panning continues until both the destination image and the origination image are viewable by the user. Using the example of FIG. 13 once again, if the user selects the hyperlink for "Saving Private Ryan", then the first phase of the hyperlink hop effect would include zooming out and panning toward the image of "Saving Private Ryan" until both the image for "Saving Private Ryan" and "Apollo 13" were visible to the user. At this point, the transition effect has provided the user with the visual impression of being moved upwardly in an arc toward the destination image. Once the destination image is in view, the second phase of the transition effect gives the user the visual impression of zooming in and panning to, e.g., on the other half of the arc, the destination image. The hop time, i.e., the amount of time both phases one and two of this transition effect are displayed, can be fixed as between any two hyperlinked image items. Alternatively, the hop time may vary, e.g., based on the distance traveled over the GUI. For example, the hop time can be parameterized as HopTime=A log(zoomed-in scale level/hop apex scale level)+B(distance between hyperlinked media items)+C, where A, B and C are suitably selected constant values.

Scaling, Layout and Searching

Given the potentially huge amount of content to be accessed using the afore-described (and other) user interfaces and systems, the need to layout objects on a display in a fashion that is pleasing to the eye as well as efficient with respect to space is becoming more important. A graphical layout deals with, for example, the number, size and specific arrangement of items on, e.g., a TV screen. Layouts are generally composed of two opposing factors, equilibrium and form. Equilibrium is achieved when objects are uniformly and symmetrically distributed which is the lowest energy state. The mind strives for equilibrium when trying to deal with complexity; however, a layout in total equilibrium is usually considered boring. To add interest to a layout, equilibrium is perturbed by introducing form. Also when considering layouts it is often useful to understand and use the concepts of centricity and eccentricity. Centricity pertains to the central location while eccentricity pertains to locations in the layout which are offset from the center. When viewing a layout there is a perceived tension, or force, between these focal points. A layout that is pleasing to the user is achieved with a mixture of equilibrium and form to combine simplicity and interest coupled with some amount of tension. These concepts are used in exemplary embodiments of the present invention when displaying groups of selectable media items, such as images of movie covers, as part of a user interface displayed on, e.g., a TV screen.

Figure 14A:
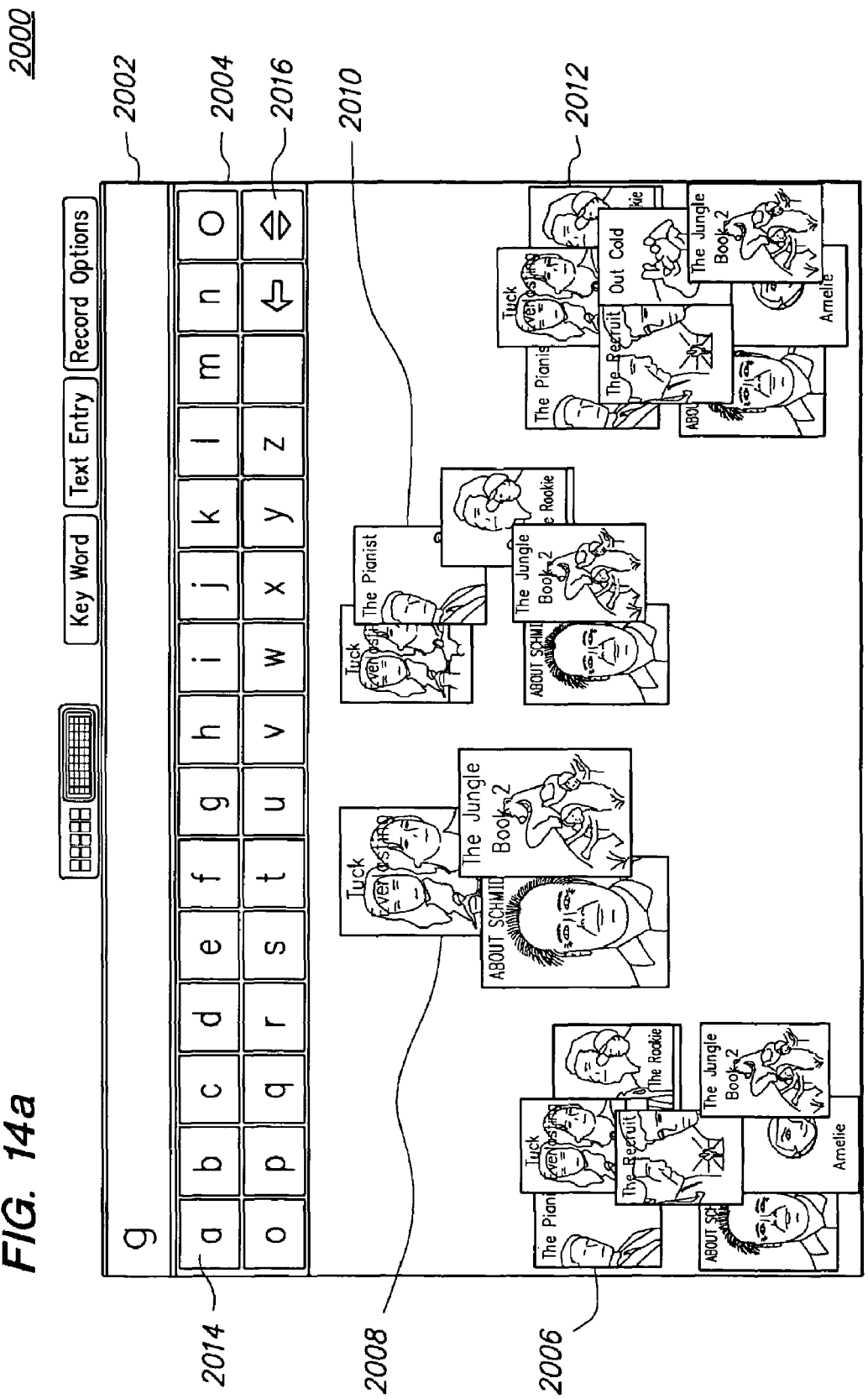
FIG. 14(a) illustrates a user interface for searching and displaying search results in a graphical layout according to exemplary embodiments of the present invention.

According to one exemplary embodiment of the present invention, a user interface associated providing a searching mechanism for searching among selectable media items can generate a displayed screen such as that illustrated in FIG. 14(a). For multiple groups of displayed items, it may be desirable that a user perceive each group as a cohesive whole. It may further be desirable to minimize the amount of border space and maximize an image size associated with each displayed item. Accordingly, this exemplary embodiment of the present invention incorporates image overlapping and a black border added to each image, although these effects could also be used independently of one another. The border helps the eye delineate each object within an overlapping layout. Overlapping increases the perception of 'belonging' desirable to display a unified group and adds a three-dimensional (3D) effect to the layout. With overlapping, a sufficient surface view of the image remains uncovered to gain the users' attention and achieve recognition. In fact, the parts of the images that are hidden through overlapping can serve to heighten the curiosity of the users. When a user positions a cursor over a particular displayed item, the hover effect described above will then reveal the entire image as well as increase its size. In addition, the overlapping feature provides additional freedom in placement rules by making better use of the space between images and groups and allowing the displayed images to be scaled significantly larger than they could be if placed separately.

The exemplary GUI screen 2000 depicted in FIG. 14(a) contains a text entry widget including a plurality of control elements 2004, with at least some of the control elements 2004 being drawn as keys or buttons having alphanumeric characters 2014 thereon, and other control elements 2004 being drawn on the interface as having non-alphanumeric characters 2016 which can be, e.g., used to control character entry. In this example, the control elements 2004 are laid out in two horizontal rows across the interface, although other configurations may be used.

Upon actuating a control element 2004, e.g., by clicking a button on a 3D pointer, the corresponding alphanumeric input is displayed in the textbox 2002, disposed above the text entry widget, and one or more groups of displayed items related to the alphanumeric input provided via the control element(s) can be displayed on the interface, e.g., below the text entry widget. Thus, the GUI screen depicted in FIG. 14(a) according to one exemplary embodiment of the present invention can be used to search for selectable media items, and graphically display the results of the search on a GUI screen, in a manner that is useful, efficient and pleasing to the user. (Note that in the illustrated example of FIG. 14(a), although the letter "g" is illustrated as being displayed in the text box 2002, the displayed movie cover images below the text entry widget simply represent a test pattern and are not necessarily related to the input letter "g" as they could be in an implementation, e.g., the displayed movie covers could be only those whose movie titles start with the letter "g"). In particular, the layout of the four groups 2006, 2008, 2010 and 2012 of displayed items within the region of the user interface allocated for search results to be displayed is based on the number of groups which are displayed and the layout of displayed items (in this example, images of movie covers) within each group is based upon the number of items displayed within each group. These layouts according to exemplary embodiments of the present invention can be governed by layout rules and algorithmically implemented in the user interface.

To illustrate how groups and items within groups can be laid out on user interfaces according to exemplary embodiments of the present invention, exemplary rules and algorithms for laying out selectable media items (but which can be equally applied to other displayed items) will now be described. To aid in understanding the application of these rules, some terminology is first defined. The phrase "group layout" refers to the layout of groups of displayed items within a group display area. In the example of FIG. 14(a), the group display area is the portion of the display screen between the bottom of the text entry widget and the bottom of the display screen (with suitable margins). The phrase "item layout" refers to the layout of items within each group and, more specifically, within an item display area associated with each group.

Figure 14B:
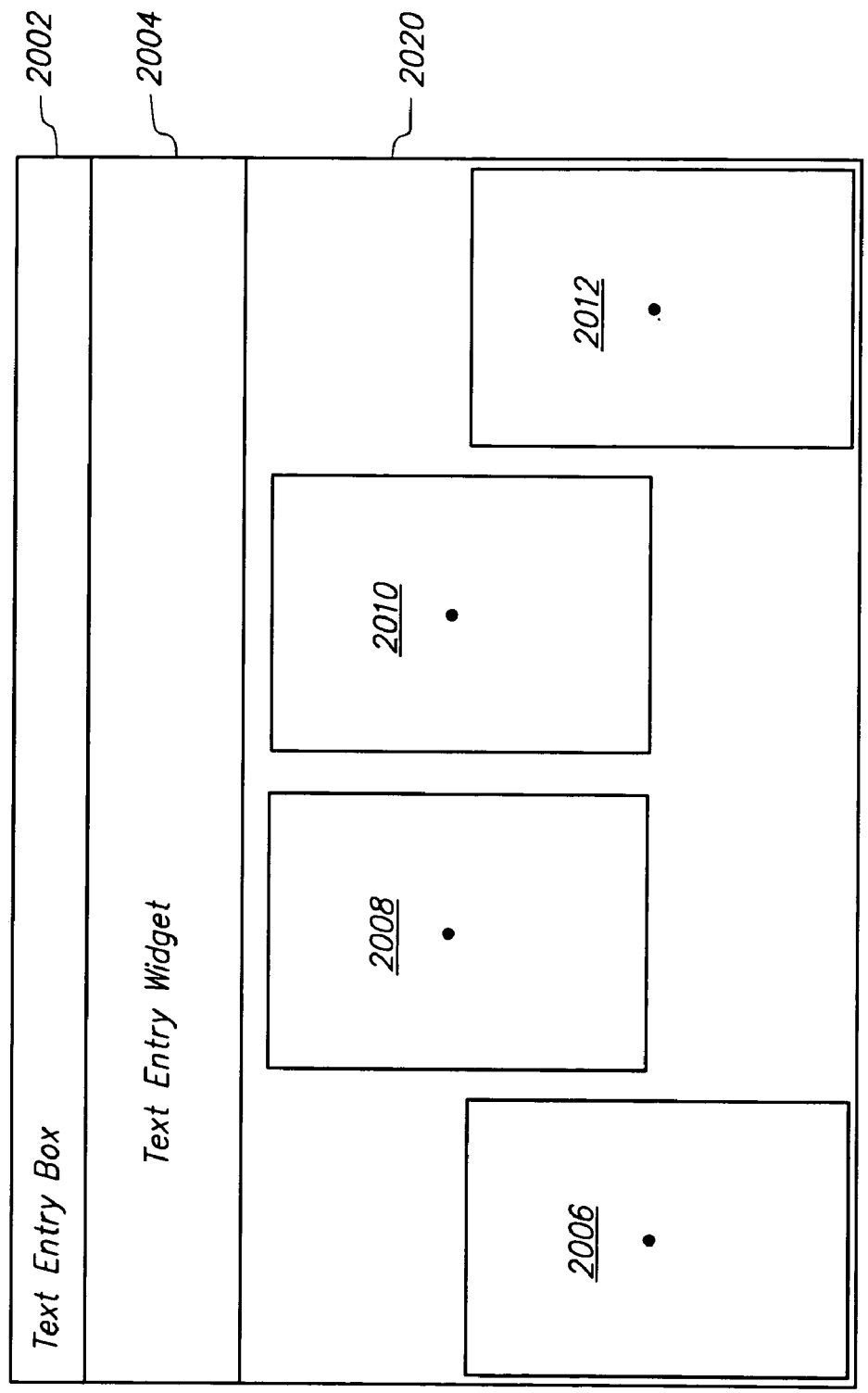
FIG. 14(b) illustrates an abstraction of a user interface for searching and displaying search results in a graphical layout according to exemplary embodiments of the present invention.

To render each of these concepts more concrete, consider the abstraction of the GUI screen 2000 of FIG. 14(a) illustrated in FIG. 14(b). Therein, the four displayed groups of items 2006, 2008, 2010 and 2012 have a group layout within a group display area 2020 that is substantially trapezoidal, e.g., connecting the center points of the groups 2006, 2008, 2010 and 2012 will form a trapezoid. Left-center display group 2008 and right-center display group 2010 are raised (placed further from the bottom) within the group display area 2020 relative to the leftmost group 2006 and rightmost group 2012. The rectangles shown in FIG. 14(b) as surrounding the display groups 2006-2012 represent exemplary item display areas for each respective group, i.e., the areas within which the items associated with each group are laid out. As seen in FIG. 14(a), these regions need not be explicitly displayed on the GUI screen 2000 (although according to other exemplary embodiments, item display area boundaries may be displayed). Moreover, those skilled in the art will appreciate that the item display areas (as well as the group display area) need not be rectangular in shape, as in the example of FIG. 14(b), but can be any desired shape. Within each item display area, the groups' displayed items are laid out according to item layout rules. An exemplary set of overlapping item layouts are shown in FIGS. 15(a)-(n) and exemplary rules for displaying these item layouts are described below. Each rule is based, at least in part, on the number of items within the group.

Group of 1 Item—Starting with FIG. 15(a), for a group consisting of one displayed item 3002, the item is placed in the item display region 3004 offset from a center of the item display region. For example, as shown in FIG. 15(b), this can be accomplished by rendering displayed item 3002 such that its center point 3006 is offset upwardly and to the left of the center point 3008 of the item display region 3004. Additionally, the item 3002 is scaled at the offset position such that a second item of the same size would not fit within the item display area 3004.

Group of 2 Items—For a group consisting of two displayed items 3010 and 3012, illustrated in FIG. 15(c), the two displayed items are laid out in the item display area by aligning the center points of the two items on a diagonal within the item display region 3004. This is shown conceptually in FIG. 15(d), wherein a center point 3014 of item 3010 is disposed up and to the left of the center point 3008 of the item display region 3004 on diagonal 3015, while a center point 3016 of item 3012 is disposed down and to the right of center point 3008.

Group of 3 Items—For a group consisting of three displayed items 3018, 3020 and 3022, illustrated in FIG. 15(e), the three displayed items are laid out in the item display area by aligning the center points of the three items on the circumference of a circle within the item display region 3004. This is shown conceptually in FIG. 15(f), wherein a center point 3024 of item 3018 is disposed above the center point 3008 of the item display region 3004 on the circumference of circle 3030, while a center point 3026 of item 3020 is disposed down and to the left of center point 3008 and a center point 3028 of item 3022 is disposed down and to the right of center point 3008.

Group of 4 Items—For a group consisting of four displayed items, 3032, 3034, 3036 and 3038, illustrated in FIG. 15(g), the four displayed items are laid out in the item display area by aligning the center points of the four items on the corners of a rhombus within the item display region 3004. This is shown conceptually in Figure 15(h), wherein a center point 3040 of item 3032 is disposed up and to the left of the center point 3008 of the item display region 3004 on rhombus 3048, while a center point 3042 of item 3034 is disposed up and to the right of the center point 3008, while a center point 3044 of item 3036 is disposed below and to the left of center point 3008 and while a center point 3046 of item 3038 is disposed below and to the right of center point 3008.

Figures 15I, 15J:
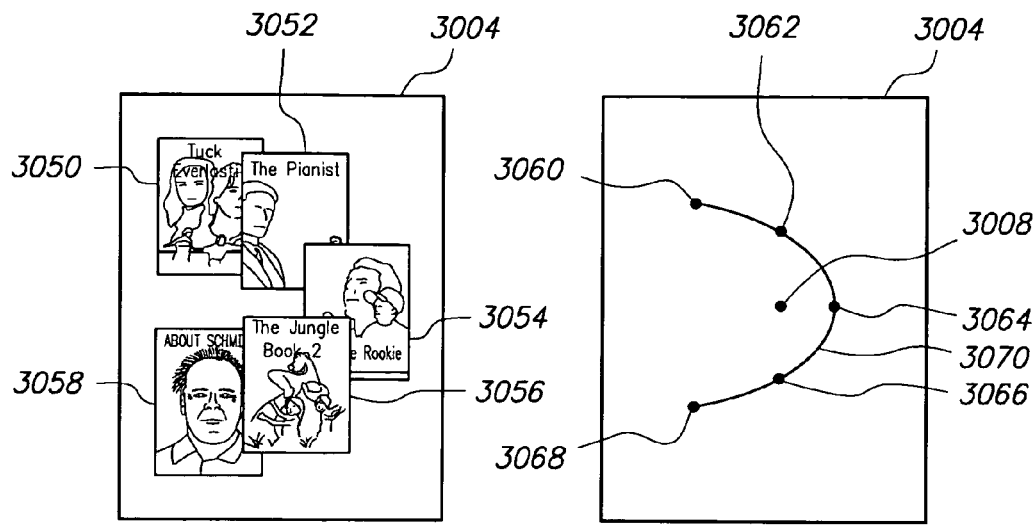
FIGS. 15(a-n) illustrate groups containing items with overlap to exemplary embodiments of the present invention.
Figures 15K, 15L:
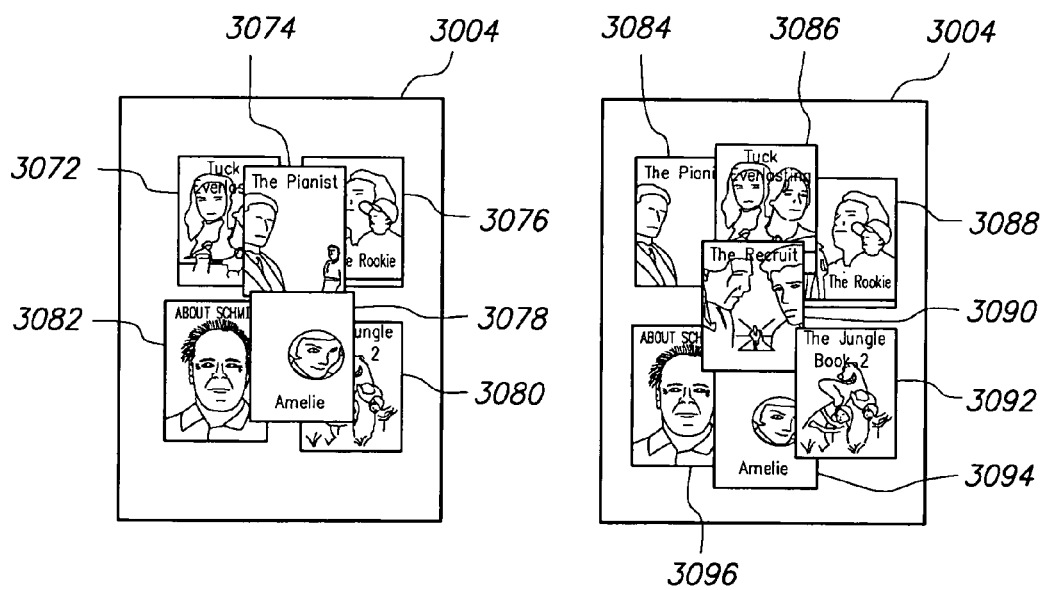
Figure 15M:
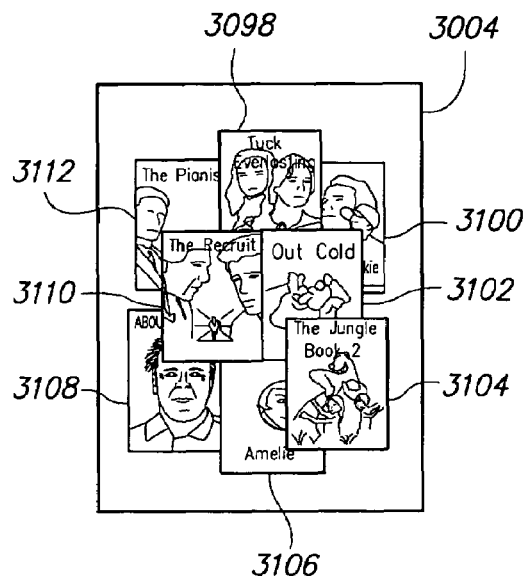
Figure 15N:
Figure 16A:
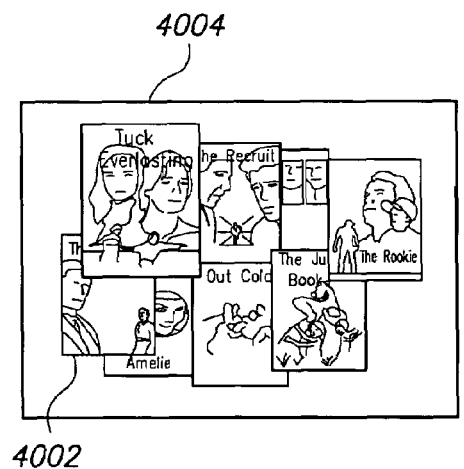
FIGS. 16(a) and 16(b) illustrate a hoverzoom effect according to exemplary embodiments of the present invention.
Figure 16B:
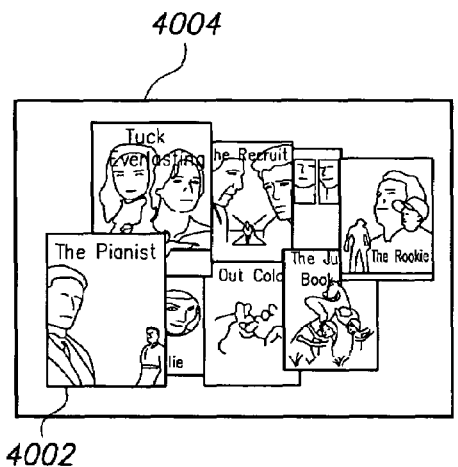

Group of 5 Items—For a group consisting of five displayed items 3050, 3052, 3054, 3056 and 3058, illustrated in FIG. 15(i), the five displayed items are laid out in the item display area 3004 by placing the center points of the five items on the right half of a circumference of an ellipse within the item display region 3004. This is shown conceptually in FIG. 15(j), wherein a center point 3060 of item 3050 is dispose up and to the left of the center point 3008 of the item display region 3004 on the right half of a circumference of an ellipse 3070, while a center point 3062 of item 3052 is disposed above the center point 3008, while a center point 3064 of item 3054 is disposed to the right of the center point 3008, while a center point 3066 of item 3056 is disposed below the center point 3008 and while a center point 3068 of item 3058 is disposed down and to the left of the center point 3008.

Group of 6 Items—For a group consisting of six displayed items, 3072, 3074, 3076, 3078, 3080 and 3082, illustrated in FIG. 15(*k*), the six displayed items are laid out in the item display area 3004 by creating a grid such that three items are arranged in an upper row above three items arranged in a lower row. An upper leftmost item 3072 is aligned above a lower leftmost item 3082 and a top edge of the upper leftmost item is higher than a top edge of an upper rightmost item. The upper rightmost item 3076 is aligned above a lower rightmost item 3080, the lower rightmost item 3080 is aligned below the upper rightmost item 3076 and a bottom edge of the lower leftmost item is lower than a bottom edge of the lower rightmost item. An upper center item 3074 is left of the center point of the group and overlaps both items in the upper row. A lower center item 3078 is right of the center point of the group and overlaps both items in the lower row and overlaps the upper center item 3074.

Group of 7 Items—For a group consisting of seven displayed items, 3084, 3086, 3088, 3090, 3092, 3094 and 3096, illustrated in FIG. 15(*l*), the seven displayed items are laid out in the item display area 3004 by creating a grid such that one item 3090 is in the center, three items are arranged in an upper row above the center item and three items are arranged below the center item in a lower row. An upper leftmost item 3084 is slightly higher than an upper rightmost item 3088 and is aligned with a lower leftmost item 3096. The upper rightmost item 3088 is slightly lower than the upper leftmost item 3084 and is aligned with a lower rightmost item 3092. The lower rightmost item 3092 is in line with both the upper rightmost item 3088 and the lower leftmost item 3096. The top edge of the middle item in the upper row 3086 is higher than the top edges of both the upper leftmost item and the upper rightmost item. The bottom edge of the middle item in the lower row 3094 is lower than a bottom edge of both the lower leftmost item 3096 and the lower rightmost item 3092. The center item 3090 can overlap all other items, the middle items in either row overlap items in that row and wherein the center item 3090 is left of the center point of the item display area 3004 and the middle items are right of the center point of the item display area 3004.

Groups of 8 Items—For a group consisting of eight displayed items, 3098, 3100, 3102, 3104, 3106, 3108, 3110 and 3112, illustrated in FIG. 15(*m*), the eight displayed items are laid out in the item display area 3004 by creating a grid such that two items are arranged in a middle row, three items are arranged in an upper row above the middle row and three items are arranged in a lower row below the middle row. An upper leftmost item 3112 is aligned with both an upper rightmost item 3100 and a lower leftmost item 3108. The upper rightmost item 3100 is aligned with both the upper leftmost item 3112 and a lower rightmost item 3104. The lower rightmost item 3104 is aligned with both the upper rightmost item 3100 and the lower leftmost item 3108. A top edge of a middle item 3098 in the upper row is higher than the top edges of both the upper leftmost item and the upper rightmost item. A bottom edge of a middle item 3106 in the lower row is lower than the bottom edge of both the lower leftmost item and the lower rightmost item. Overlapping occurs between the middle row and all other rows, and that the center items in either the upper row or the lower row overlap items in their respective row. Similar overlapping layout rules and algorithms can be applied to groups having more items, e.g., up to and including sixteen items, an example of which is shown in FIG. 15(*n*).

Having described exemplary layout rules according to one exemplary embodiment of the present invention, consider again FIG. 14(*a*). In this example, the layout rules described above are recursively applied to display four groups of search results, e.g., selectable media items represented by movie cover images. The four groups include a leftmost group 2006, a left-center group 2008, a right-center group 2010 and a rightmost group 2012. When the user interface software prepares to display these groups on the GUI screen 2000, it recursively applies the above described rules to determine an appropriate display layout for the groups, as well as for the items within each group. For example, the left-center group 2008 has three items which are arranged such that center points of each item are located on a circumference of a circle and each of the three items overlap. Similarly, the other groups 2006, 2010 and 2012 have their items laid out by applying the rule associated with the number of items in the respective group.

As mentioned above, a hover zoom effect can be used in conjunction with overlapping images to allow the user to view the portion of the image obscured within the collage layout. Consider, for example, the group layout illustrated in FIG. 16(*a*) involves a group of eight, overlapping items. When the user points to an image, it rises to the top and is scaled to a larger size ("hover zoom"). Thus, in FIG. 16(*b*), the user has moved a cursor (not shown in FIG. 16(*b*)), or otherwise indicated an initial selection of the item 4002 (associated with the movie "The Pianist"), causing that image to rise above the item 4004 which was obscuring it in its originally displayed state and increasing the size of the item 4002.

According to another exemplary embodiment of the present invention, overlap need not be used in displaying groups of items, e.g., when fewer items are displayed. Thus, another set of rules and algorithms can be applied for laying out items without use of overlap as depicted in FIGS. 17(*a*)-(*h*). Exemplary rules for displaying a single group with non-overlapping items based on the number of items in the group are oresented below in Table 1.

TABLE 1

| Number of Items | Layout Rule |
|---|---|
| 1 | FIG. 17(a) - The item 5004 is placed to the right or left of the center point of the item display region 5002. The item 5004 is scaled to a size such that a second item of the same size and border area will not fit in the item display region 5002. |
| 2 | FIG. 17(b) - The two items, 5006 and 5008, are scaled to fit side by side and aligned on a diagonal such that a third item will not fit in the item display region 5002. |

TABLE 1-continued

Figure 17E:
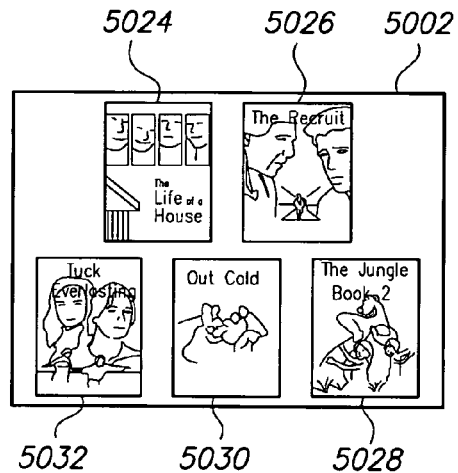
FIGS. 17(a-h) illustrate groups containing items without overlap according to exemplary embodiments of the present invention.
Figure 17F:
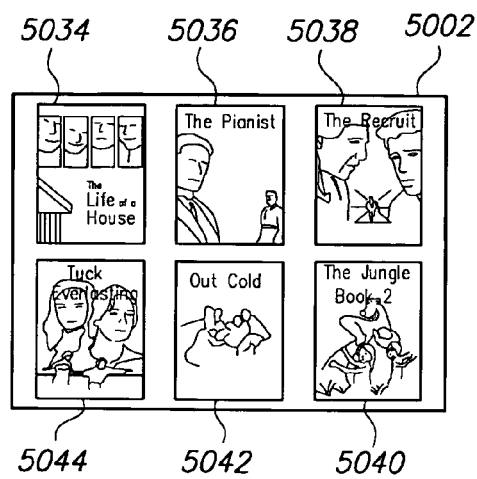
Figure 17G:
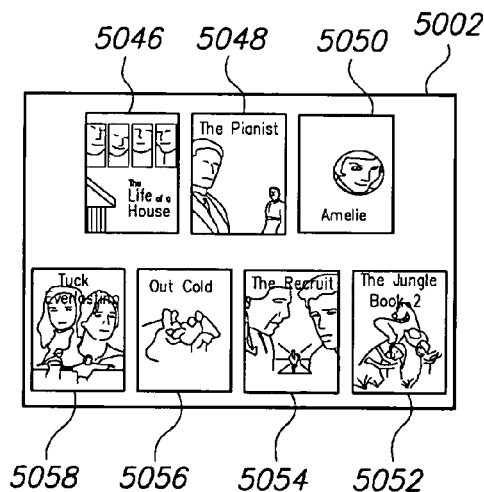
Figure 17H:
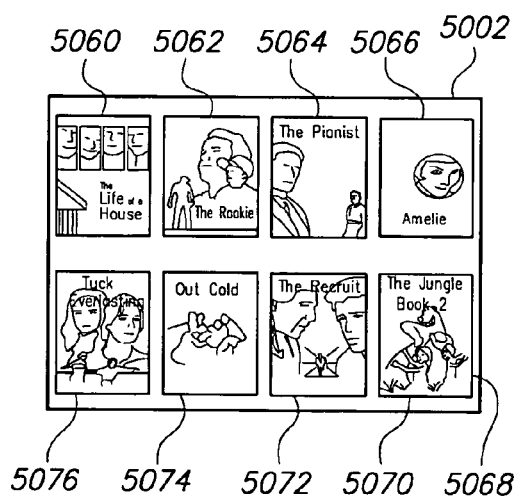

| Number of Items | Layout Rule |
|---|---|
| 3 | FIG. 17(c) - The three items, 5010, 5012 and 5014, are scaled to fit side by side and aligned on a diagonal such that a fourth item will not fit in the item display region 5002. |
| 4 | FIG. 17(d) - The four items, 5016, 5018, 5020 and 5022, are scaled and arranged in a circle such that a fifth item will not fit in the item display region 5002. |
| 5 | FIG. 17(e) - The five items, 5024, 5026, 5028, 5030 and 5032, are arranged in a pyramid such that a sixth item will not fit in the item display region 5002. |
| 6 | FIG. 17(f) - The six items, 5034, 5036, 5038, 5040, 5042 and 5044, are scaled in two rows forming a rectangle such that a seventh item will not fit in the item display region 5002. |
| 7 | FIG. 17(g) - The seven items, 5046, 5048, 5050, 5052, 5054, 5056 and 5058, are arranged in a pyramid such that an eighth item will not fit in the item display region 5002. |
| 8 | FIG. 17(h) - The eight items, 5060, 5062, 5064, 5066, 5070, 5072, 5074 and 5076, are scaled in two rows forming a rectangle such that a ninth item will not fit in the item display region 5002. |

Figure 18:
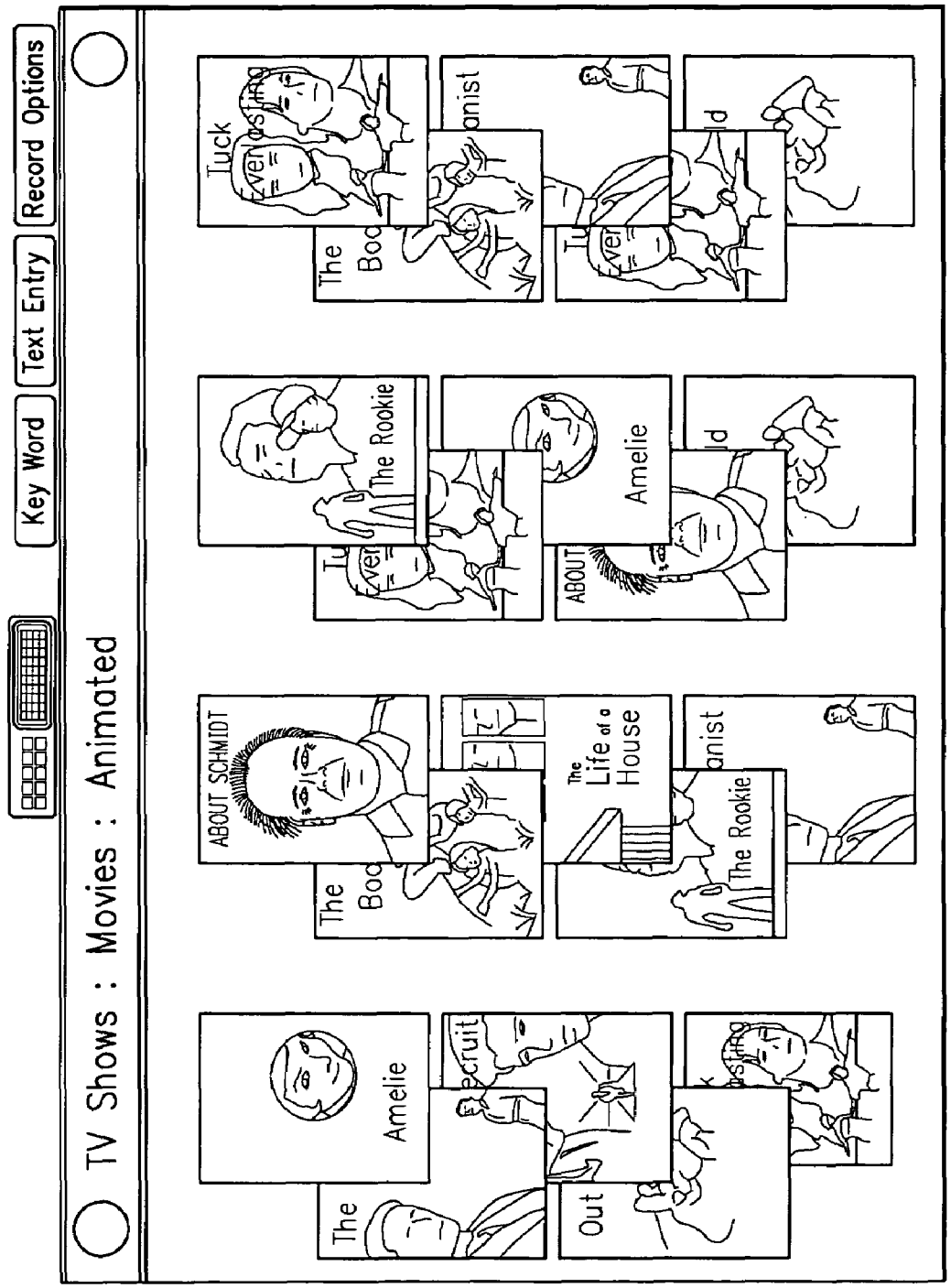
FIG. 18 illustrates groups with vertical overlapping in a user interface according to exemplary embodiments of the present invention.
Figure 19:
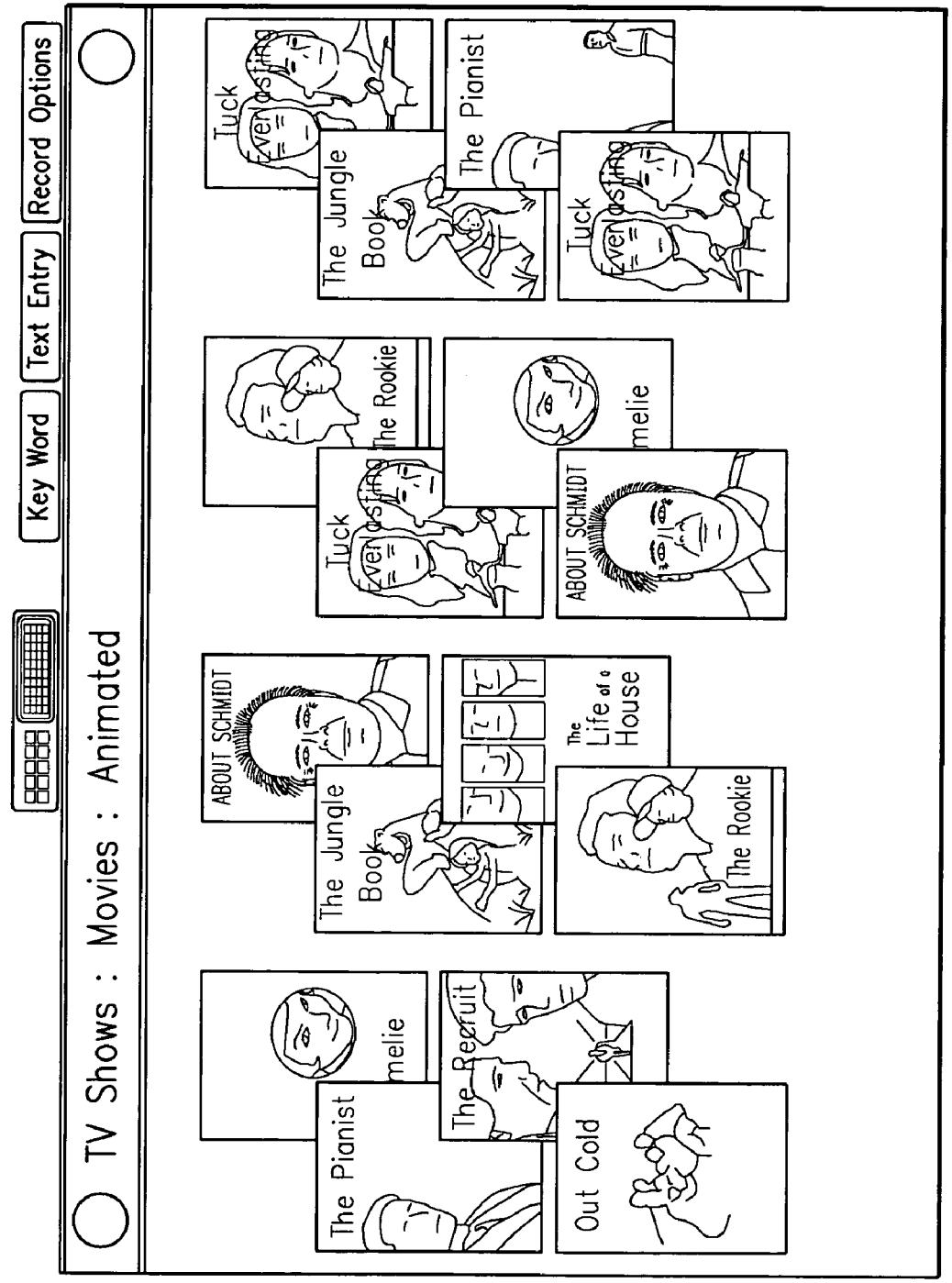
FIG. 19 illustrates groups with vertical overlapping in a user interface according to exemplary embodiments of the present invention.

Numerous other variations of user interface layouts are contemplated by exemplary embodiments of the present invention. For example, the layout rules and algorithms described above can be used without displaying a text entry box and/or a text entry widget. An example is illustrated in FIG. 18. Therein, horizontal overlapping is also used for the displayed results, e.g., offsetting the images from a vertical center of each group to add some eccentricity to the layout. Image size affects the percentage of overlap. The percentage of overlap used in generating GUI screens according to exemplary embodiments of the present invention can be a function of screen size, number of items being displayed and/or user preference. Compare the layout of FIG. 19 with that of FIG. 18. The displayed items in FIG. 18 have a 50% horizontal overlap, while the (larger) displayed items in FIG. 19 have a 30% horizontal overlap. Another difference is that the items in FIG. 18 are stacked top to bottom (i.e., the topmost image in each vertical stack covers a portion of the second topmost image in each vertical stack, etc.), whereas the items in FIG. 19 are stacked bottom to top.

Systems and methods for processing data to generate layouts on user interfaces according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. The layout rules described herein can be encoded algorithmically in software and applied recursively, e.g., to recursively layout groups within a group display area and items within an item display area. Although the examples described above refer to two "layers" within each layout, i.e., a group layer and an item layer, those skilled in the art will appreciate that more (or fewer) than two layers can be implemented. For three or more layers, the layout rules can be applied recursively to generate a layout for each layer. According to these exemplary embodiments of the present invention, items are laid out in a display space in a manner which provides a pleasing appearance to the user, while at the same time making efficient use of limited display (e.g., TV screen) space to display more (and larger) images per layout.

Even using techniques, such as overlapping and scaling, to reduce the amount of space which each item requires on the user interface, there are still potential limits to the number of items which can be displayed on a single GUI screen while providing enough graphic detail to the item to be pleasing to the user. Naturally, such potential limits depend upon numerous implementation details, such as the type of items being displayed, the amount of space allocated for item display, the screen resolution, etc. For example movie covers have one ratio which is different from standard TV images and still further different from high definition TV images. Sometimes 'show cards' can be used in place of still images as items on the user interface, which also have different size ratios. Music album covers have a different size ratio. For each set of parameters, a different potential limit on the number of items being displayed can be established. For example, where movie cover images are used on a user interface which is intended to be shown on a high definition television screen, a maximum of 128 movie covers can be shown on a single GUI screen. If a search result or particular GUI screen should display more than 128 movie cover images in such an exemplary user interface according to the present invention, then a scroll mechanism can be added to the interface to allow the user to scroll down beyond an initial display of 128 items.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A user interface displayed on a screen comprising:
a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that groups, wherein said layout of groups involves placing a center point of each group at a location on said user interface, which location is determined based on the number of groups to be dislayed, wherein each of said displayed items associated with one of said groups is displayed within a rectangular region disposed at a respective center point, wherein if said second number is one for one of said plurality of groups, the item in that group is placed in said rectangular region by offsetting a center point associated with that item from the center point of said group and scaling said item within said rectangular region to a size such that a second item of the same size will not fit.

2. The user interface of claim 1, wherein said displayed items are movie cover images, said first number of groups is four, said second number of items within a leftmost group displayed on said user interface is seven and further wherein:

said four groups include a leftmost group, a left-center group, a right-center group each having a center point, and a rightmost group;

said layout of said four groups on said user interface is such that a center point of each group is disposed at a corner of a trapezoid;

the left-center group and the right center group having their center points further from a bottom of said user interface than the center points of the leftmost and the rightmost group; and said left-center group has three items which are arranged such that center points of each item are located on a circumference of a circle and each of said three items overlap.

3. The user interface of claim 1, wherein said plurality of control elements are laid out in two horizontal rows.

4. The user interface of claim 1, wherein said text box is displayed above said plurality of control elements and said groups of displayed items are displayed below said plurality of control elements.

5. The user interface of claim 1, wherein said displayed items are images.

6. The user interface of claim 5, wherein said images are movie covers.

7. The user interface of claim 1, wherein said number of groups changes based upon search results entered using said plurality of control elements.

8. The user interface of claim 1, wherein said groups do not overlap and at least some of said items within each group do overlap.

9. A user interface displayed on a screen comprising:

a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that group, wherein said layout of groups involves plaicing a center point of each group at a location on said user interface, which location is determined based on the number of groups to be displayed, wherein each of said displayed items associated with one of said groups is displayed within a rectangular reg ion disposed at a respective center point, wherein if said second number is two for one of said plurality of groups, two items are placed in said rectangular region by aligning the center points of said two items on a diagonal within said rectangular region.

10. A user interface displayed on a screen comprising:

a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that group, wherein said layout of groups involves placing a center point of each group at a location on said user interface, which location is determined based on the number of groups to be displayed, wherein each of said displayed items associated with one of said groups is displayed within a rectangular region disposed at a respective center point, wherein if said second number is three for one of said plurality of groups, three items are placed in said rectangular region by arranging the center points of said three items on a circumference of a circle within said rectangular region.

11. A user interface displayed on a screen comprising:

a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that group, wherein said layout of groups involves placing a center point of each group at a location on said user interface, which location is determined based on the number of groups to be displayed, wherein each of said displayed items associated with one of said groups is displayed within a rectangular region disposed at a respective center point, wherein if said second number is four for one of said plurality of groups, four items are placed in said rectangular region by arranging the center points of said four items on corners of a rhombus within said rectangular region.

12. A user interface displayed on a screen comprising:

a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that group, wherein said layout of groups involves placing a center point of each group at a location on said user interface, which location is determined based on the number of groups to be displayed, wherein each of said displayed items associated with one of said groups is displayed within a rectangular region disposed at a respective center point, wherein if said second number is five for one of said plurality of groups, five items are placed in said rectangular region by arranging the center points of five items along a right half of a grcumference of an ellipse within said rectangular region.

13. A user interface displayed on a screen comprising:

a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that group, wherein said layout of groups involves placing a center point of each group at a location on said user interface, which location is determined based on the number of groups to be displayed, wherein each of said displayed items associated with one of said groups is displayed within a rectangular region disposed at a respective center point, wherein if said second number is six for one of said plurality of groups, six items are placed in a grid such that three items are arranged in an upper row above three items arranged in a lower row, wherein an upper leftmost item is aligned above a lower leftmost item and a top edge of said upper leftmost item is higher than a top edge of an upper rightmost item, said upper rightmost item is aligned above a lower rightmost item, said lower rightmost item is aligned below said upper rightmost item and a bottom edge of said lower leftmost item is lower than a bottom edge of said lower rightmost item, an upper center item is left of the center point of said group and overlaps both items in said upper row, a lower center item is right of the center point of said group and overlaps both items in said lower row and overlaps said upper center item.

14. A user interface displayed on a screen comprising:

a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that group, wherein said layout of groups involves placing a center point of each group at a location on said user interface, which location is determined based on the number of groups to be displayed, wherein each of said displayed items associated with one of said groups is displayed within a rectangular reg ion disposed at a respective center point, wherein if said second number is seven for one of said plurality of groups, seven items are placed in a grid such that one item is in the center, three items are arranged in an upper row above the center item and three items are arranged below said center item in a lower row, wherein an upper leftmost item is slightly higher than an upper rightmost item and is aligned with a lower leftmost item, the upper rightmost item is slightly lower than the upper leftmost item and is aligned with a lower rightmost item, the lower rightmost item is in line with both the upper rightmost item and the lower leftmost item and a top edge of a middle item in the upper row are higher than top edges of both the upper leftmost item and the upper rightmost item, and a bottom edge of a middle item in the lower row is lower than a bottom edge of both the lower leftmost item and the lower rightmost item, wherein the center item overlaps all other items, the middle items in either row overlap items in that row and wherein the center item is left of the center point of said group and the middle items are right of the center point of said group.

15. A user interface displayed on a screen comprising:

a plurality of control elements, at least some of said plurality of control elements having at least one alphanumeric character displayed thereon;

a textbox for displaying alphanumeric characters entered using said plurality of control elements; and a plurality of groups of displayed items, wherein a layout of said plurality of groups on said user interface is based on a first number of groups which are displayed, and wherein a layout of said displayed items within a group is based on a second number of said items displayed within that group, wherein said layout of groups involves placing a center point of each group at a location on said user interface, which location is determined based on the number of groups to be displayed, wherein each of said displayed items associated with one of said groups is displayed within a rectangular reg ion disposed at a respective center point, wherein if said second number is eight for one of said plurality of groups, eight items are placed in a grid such that two items are arranged in a middle row, three items are arranged in an upper row above said middle row and three items are arranged in a lower row below said middle row, wherein an upper leftmost item is aligned with both an upper rightmost item and a lower leftmost item, said upper rightmost item is aligned with both said upper leftmost item and a lower rightmost item, said lower rightmost item is aligned with both said upper rightmost item and said lower leftmost item, and a top edge of a middle item in said upper row is higher than top edges of both the upper leftmost item and the upper rightmost item, and a bottom edge of a middle item in said lower row is lower than a bottom edge of both said lower leftmost item and said lower rightmost item, wherein overlapping occurs between said middle row and all other rows, and that said center items in either said upper row or said lower row overlap items in their respective row.

16. A method for laying out items in a user interface comprising the steps of:
   laying out a plurality of groups of items within a group display space, said groups being laid out within said display space in one of a plurality of different group layout patterns which is selected as a function of the number of said plurality of groups; and
   laying out, for each of said plurality of groups, a plurality of items within an item display space associated with a respective one of said plurality of groups, said items being laid out within a respective item display space in one of a plurality of different item layout patterns which is selected as a function of the number of said plurality of items,
   wherein said layout of groups involves placing a center point of each group at a location on said user interface, which location is determined based on the number of groups to be displayed,
   wherein each of said displayed items associated with one of said groups is displayed within a rectangular region disposed at a respective center point,
   wherein if the number of said plurality of items is one for one of said plurality of groups, the item in that group is placed in said rectangular region by offsetting a center point associated with that item from the center point of said group and scaling said item within said rectangular region to a size such that a second item of the same size will not fit.

17. The method of claim 16, further comprising the step of:
   performing said steps of laying out said plurality of groups and plurality of items in accordance with at least one set of layout rules.

18. The method of claim 17, wherein said layout rules are applied recursively to said steps of laying out said plurality of groups and said plurality of items.

19. The method of claim 16, wherein said user interface is displayed on a television and said items are movie cover images, wherein selection of one of said movie cover images by a user results in additional information being displayed on said user interface for a movie associated therewith.

20. The method of claim 16, further comprising the step of:
   providing a plurality of control elements on said user interface, at least some of said plurality of control elements having at least one alphanumeric character displayed thereon; and
   providing a textbox for displaying alphanumeric characters entered using said plurality of control elements on said user interface.

21. The method of claim 20, wherein said number of groups changes based upon search results entered using said plurality of control elements.

22. The method of claim 16, wherein said groups do not overlap and at least some of said items within each group do overlap.

23. A method for laying out items in a user interface comprising the steps of:
   laying out a plurality of groups of items within a group display space, said groups being laid out within said display space in one of a plurality of different group layout patterns which is selected as a function of the number of said plurality of groups; and
   laying out, for each of said plurality of groups, a plurality of items within an item display space associated with a respective one of said plurality of groups, said items being laid out within a respective item display space in one of a plurality of different item layout patterns which is selected as a function of the number of said plurality of items,
   wherein said user interface is displayed on a television and said items are movie cover images, wherein selection of one of said movie cover images by a user results in additional information being displayed on said user interface for a movie associated therewith, wherein said television is a high definition television and a maximum number of movie cover images displayed on a single GUI screen without scrolling is 128.

24. A method for laying out items in a user interface comprising the steps of:
   laying out a plurality of groups of items within a group display space, said groups being laid out within said display space in one of a plurality of different group layout patterns which is selected as a function of the number of said plurality of groups; and
   laying out, for each of said plurality of groups, a plurality of items within an item display space associated with a respective one of said plurality of groups, said items being laid out within a respective item display space in one of a plurality of different item layout patterns which is selected as a function of the number of said plurality of items,
   wherein said layout of groups involves placing a center point of each group at a location on said user interface, which location is determined based on the number of groups to be displayed,
   wherein each of said displayed items associated with one of said groups is displayed within a rectangular region disposed at a respective center point, wherein if the number of said plurality of items is two for one of said plurality of groups, two items are placed in said rectangular region by aligning the center points of said two items on a diagonal within said rectangular region.

25. A method for laying out items in a user interface comprising the steps of:
   laying out a plurality of groups of items within a group display space, said groups being laid out within said display space in one of a plurality of different group layout patterns which is selected as a function of the number of said plurality of groups; and
   laying out, for each of said plurality of groups, a plurality of items within an item display space associated with a respective one of said plurality of grourps, said items being laid out within a respective item display space in one of a plurality of different item layout patterns which is selected as a function of the number of said plurality of items,
   wherein said layout of groups involves placing a center point of each group at a location on said user interface, which location is determined based on the number of groups to be displayed,
   wherein each of said displayed items associated with one of said groups is displayed within a rectangular region disposed at a respective center point, wherein if the number of said plurality of items is three for one of said plurality of groups, three items are placed in said rectangular region by arranging the center points of said three items on a circumference of a circle within said rectangular region.

26. A method for laying out items in a user interface comprising the steps of:
laying out a plurality of groups of items within a group display space, said groups being laid out within said display space in one of a plurality of different group layout patterns which is selected as a function of the number of said plurality of groups; and
laying out, for each of said plurality of groups, a plurality of items within an item display space associated with a respective one of said plurality of grourp, said items being laid out within a respective item display space in one of a plurality of different item layout patterns which is selected as a function of the number of said plurality of items,
wherein said layout of groups involves placing a center point of each group at a location on said user interface, which location is determined based on the number of groups to be displayed,
wherein each of said displayed items associated with one of said groups is displayed within a rectangular region disposed at a respective center point, wherein if the number of said plurality of items is four for one of said plurality of groups, four items are placed in said rectangular region by arranging the center points of said four items on corners of a rhombus within said rectangular region.

27. A method for laying out items in a user interface comprising the steps of:
laying out a plurality of groups of items within a group display space, said groups being laid out within said display space in one of a plurality of different group layout patterns which is selected as a function of the number of said plurality of groups; and
laying out, for each of said plurality of groups, a plurality of items within an item display space associated with a respective one of said plurality of groups, said items being laid out within a respective item display space in one of a plurality of different item layout patterns which is selected as a function of the number of said plurality of items,
wherein said layout of groups involves placing a center point of each group at a location on said user interface, which location is determined based on the number of groups to be displayed,
wherein each of said displayed items associated with one of said groups is displayed within a rectangular region disposed at a respective center point, wherein if the number of said plurality of items is five for one of said plurality of groups, five items are placed in said rectangular region by arranging the center points of five items along a right half of a circumference of an ellipse within said rectangular region.

28. A method for laving out items in a user interface comprising the steps of:
laying out a plurality of groups of items within a group display space, said groups being laid out within said display space in one of a plurality of different group layout patterns which is selected as a function of the number of said plurality of groups; and
laying out, for each of said plurality of groups, a plurality of items within an item display space associated with a respective one of said plurality of groups, said items being laid out within a respective item display space in one of a plurality of different item layout patterns which is selected as a function of the number of said plurality of items,
wherein said layout of groups involves placing a center point of each group at a location on said user interface, which location is determined based on the number of groups to be displayed,
wherein each of said displayed items associated with one of said groups is displayed within a rectangular region disposed at a respective center point, wherein if the number of said plurality of items is six for one of said plurality of groups, six items are placed in a grid such that three items are arranged in an upper row above three items arranged in a lower row, wherein an upper leftmost item is aligned above a lower leftmost item and a top edge of said upper leftmost item is higher than a top edge of an upper rightmost item, said upper rightmost item is aligned above a lower rightmost item, said lower rightmost item is aligned below said upper rightmost item and a bottom edge of said lower leftmost item is lower than a bottom edge of said lower rightmost item, an upper center item is left of the center point of said group and overlaps both items in said upper row, a lower center item is right of the center point of said group and overlaps both items in said lower row and overlaps said upper center item.

29. A method for laving out items in a user interface comprising the steps of:
laying out a plurality of groups of items within a group display space, said groups being laid out within said display space in one of a plurality of different group layout a patterns which is selected as a function of the number of said plurality of groups; and
laying out, for each of said plurality of groups, a plurality of items within an item display space associated with a respective one of said plurality of groups, said items being laid out within a respective item display space in one of a plurality of different item layout patterns which is selected as a function of the number of said plurality of items,
wherein said layout of groups involves placing a center point of each group at a location on said user interface, which location is determined based on the number of groups to be displayed,
wherein each of said displayed items associated with one of said groups is displayed within a rectangular region disposed at a respective center point, wherein if the number of said plurality of items is seven for one of said plurality of groups, seven items are placed in a grid such that one item is in the center, three items are arranged in an upper row above the center item and three items are arranged below said center item in a lower row, wherein an upper leftmost item is slightly higher than an upper rightmost item and is aligned with a lower leftmost item, the upper rightmost item is slightly lower than the upper leftmost item and is aligned with a lower rightmost item, the lower rightmost item is in line with both the upper rightmost item and the lower leftmost item and a top edge of a middle item in the upper row are higher than top edges of both the upper leftmost item and the upper rightmost item, and a bottom edge of a middle item in the lower row is lower than a bottom edge of both the lower leftmost item and the lower rightmost item,
wherein the center item overlaps all other items, the middle items in either row overlap items in that row and wherein the center item is left of the center point of said group and the middle items are right of the center point of said group.

30. A method for laying out items in a user interface comprising the steps of:

laying out a plurality of groups of items within a group display space, said groups being laid out within said display space in one of a plurality of different group layout patterns which is selected as a function of the number of said plurality of groups; and laying out, for each of said plurality of groups, a plurality of items within an item display space associated with a respective one of said plurality of grourJs. said items being laid out within a respective item display space in one of a plurality of different item layout patterns which is selected as a function of the number of said plurality of items, wherein said layout of groups involves plagng a center point of each group at a location on said user interface, which location is determined based on the number of groups to be displayed, wherein each of said displayed items associated with one of said groups is displayed within a rectangular region disposed at a respective center point, wherein if the number of said plurality of items is eight for one of said plurality of groups, eight items are placed in a grid such that two items are arranged in a middle row, three items are arranged in an upper row above said middle row and three items are arranged in a lower row below said middle row, wherein an upper leftmost item is aligned with both an upper rightmost item and a lower leftmost item, said upper rightmost item is aligned with both said upper leftmost item and a lower rightmost item, said lower rightmost item is aligned with both said upper rightmost item and said lower leftmost item, and a top edge of a middle item in said upper row is higher than top edges of both the upper leftmost item and the upper rightmost item, and a bottom edge of a middle item in said lower row is lower than a bottom edge of both said lower leftmost item and said lower rightmost item, wherein overlapping occurs between said middle row and all other rows, and that said center items in either said upper row or said lower row overlap items in their respective row.

* * * * *